(12) United States Patent
Cui et al.

(10) Patent No.: US 12,316,970 B2
(45) Date of Patent: May 27, 2025

(54) IMAGE PROCESSING METHOD AND ELECTRONIC DEVICE

(71) Applicant: HONOR DEVICE CO., LTD., Shenzhen (CN)

(72) Inventors: Hantao Cui, Shenzhen (CN); Zirong Wang, Shenzhen (CN); Zhibing Ding, Shenzhen (CN); Hongjie Wang, Shenzhen (CN); Yilun Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/280,521

(22) PCT Filed: Aug. 18, 2022

(86) PCT No.: PCT/CN2022/113363
§ 371 (c)(1),
(2) Date: Sep. 6, 2023

(87) PCT Pub. No.: WO2023/056785
PCT Pub. Date: Apr. 13, 2023

(65) Prior Publication Data
US 2024/0155236 A1 May 9, 2024

(30) Foreign Application Priority Data

Oct. 9, 2021 (CN) .......................... 202111176340.6
Jan. 29, 2022 (CN) ......................... 202210112240.5

(51) Int. Cl.
*H04N 23/69* (2023.01)
*G06T 5/50* (2006.01)
*H04N 23/63* (2023.01)

(52) U.S. Cl.
CPC ............... *H04N 23/69* (2023.01); *G06T 5/50* (2013.01); *H04N 23/632* (2023.01); *G06T 2207/10144* (2013.01); *G06T 2207/20221* (2013.01)

(58) Field of Classification Search
None
See application file for complete search history.

(56) References Cited

U.S. PATENT DOCUMENTS 6,694,487 B1 * 2/2004 Ilsar ...................... G06F 40/106
715/274
11,070,743 B2 7/2021 Sun et al.
(Continued)

FOREIGN PATENT DOCUMENTS

| CN | 107995432 A | 5/2018 |
|---|---|---|
| CN | 109496425 A | 3/2019 |

(Continued)

*Primary Examiner* — James M Hannett
(74) *Attorney, Agent, or Firm* — Fish & Richardson P.C.

(57) ABSTRACT

This application provides an image processing method and an electronic device, and relates to the field of image application technologies. In a scenario in which an electronic device starts a plurality of cameras for photographing, details of images or videos captured by the plurality of cameras can be enriched, to improve photographing effect of the electronic device. In the method, an electronic device may determine a target zoom ratio in response to a zoom operation input by a user, and start a second camera; and when the target zoom ratio is greater than or equal to a first preset value and less than or equal to a second preset value, both the first camera and the second camera capture image frames through overlapping exposure, and then fusion is performed on the image frames captured by the first camera and the second camera to generate a preview image.

20 Claims, 17 Drawing Sheets

(56) References Cited

U.S. PATENT DOCUMENTS

| | | | |
|---|---|---|---|
| 11,206,352 B2 | 12/2021 | Wang et al. | |
| 2007/0177048 A1 | 8/2007 | Van Dyke et al. | |
| 2012/0257077 A1 | 10/2012 | Suzuki | |
| 2017/0054919 A1 | 2/2017 | Laroia | |
| 2018/0098000 A1 | 4/2018 | Park et al. | |
| 2018/0152624 A1* | 5/2018 | Li | H04N 23/73 |
| 2019/0297275 A1 | 9/2019 | Lee et al. | |
| 2020/0358954 A1 | 11/2020 | Wang et al. | |

FOREIGN PATENT DOCUMENTS

| | | |
|---|---|---|
| CN | 110198417 A | 9/2019 |
| CN | 110198418 A | 9/2019 |
| CN | 110198419 A | 9/2019 |
| CN | 110213502 A | 9/2019 |
| CN | 110248098 A | 9/2019 |
| CN | 110572584 A | 12/2019 |
| CN | 111641778 A | 9/2020 |
| CN | 111986129 A | 11/2020 |
| CN | 112188082 A | 1/2021 |
| KR | 20200018921 A | 2/2020 |

* cited by examiner

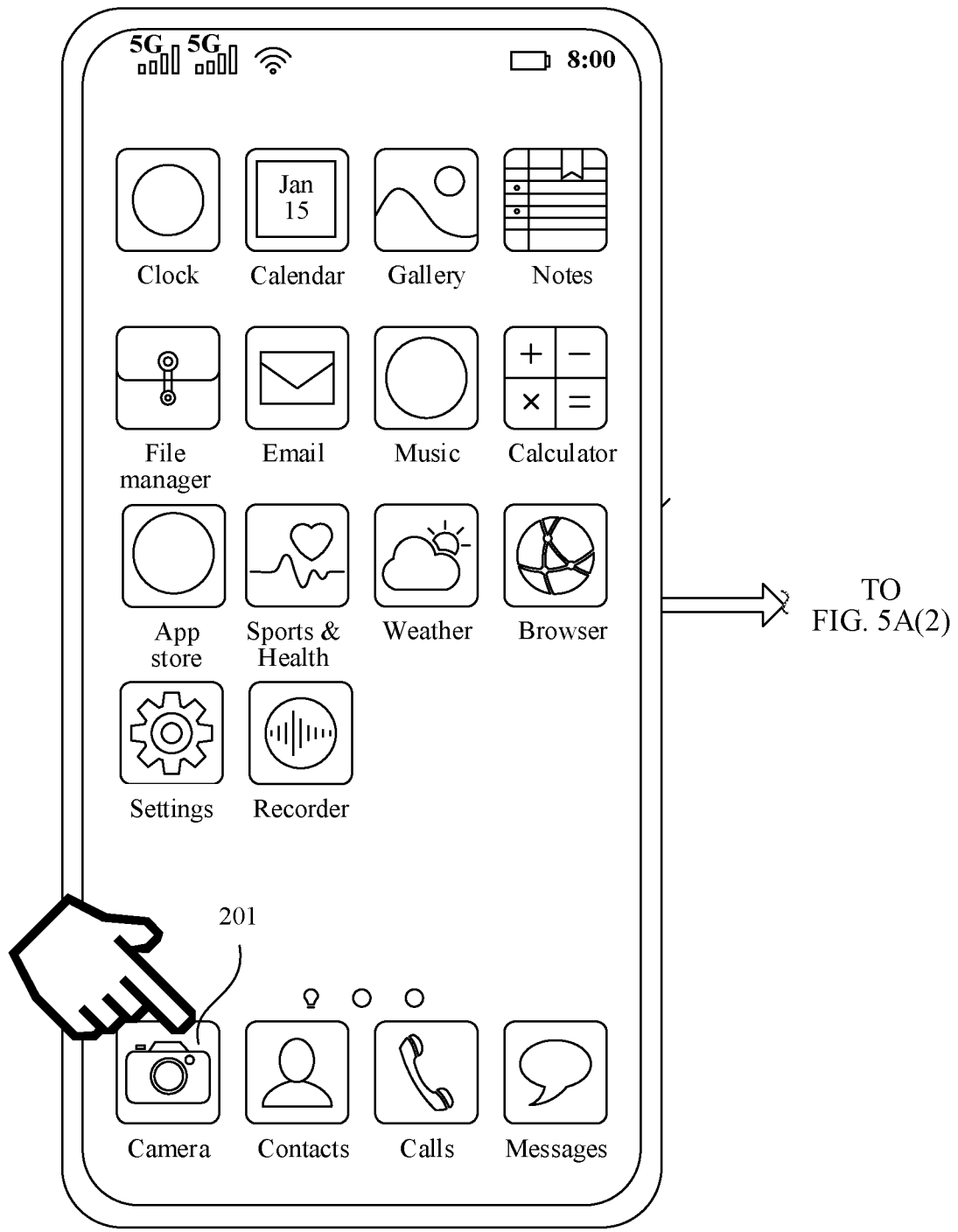
FIG. 5A(1)

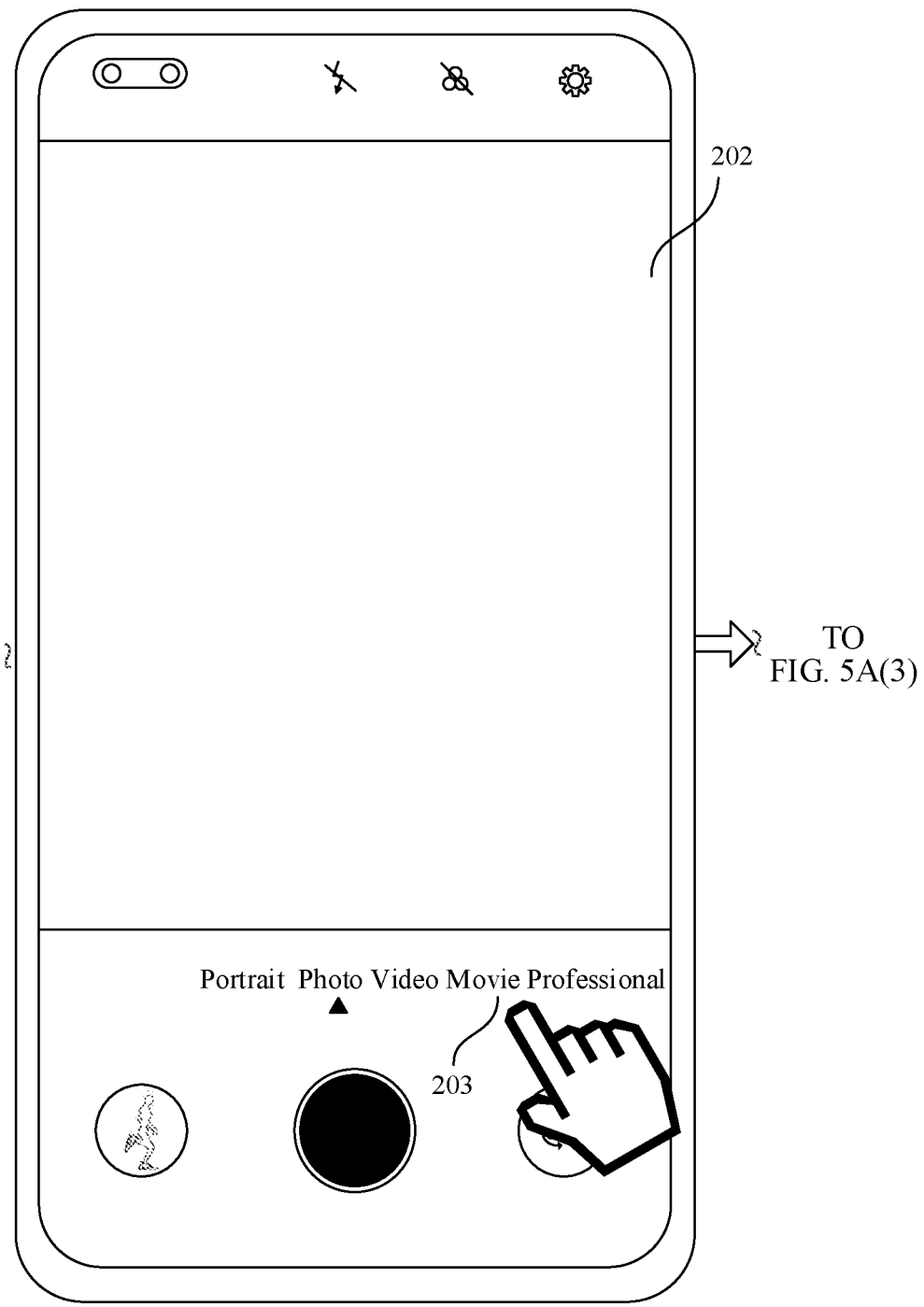
FIG. 5A(2)

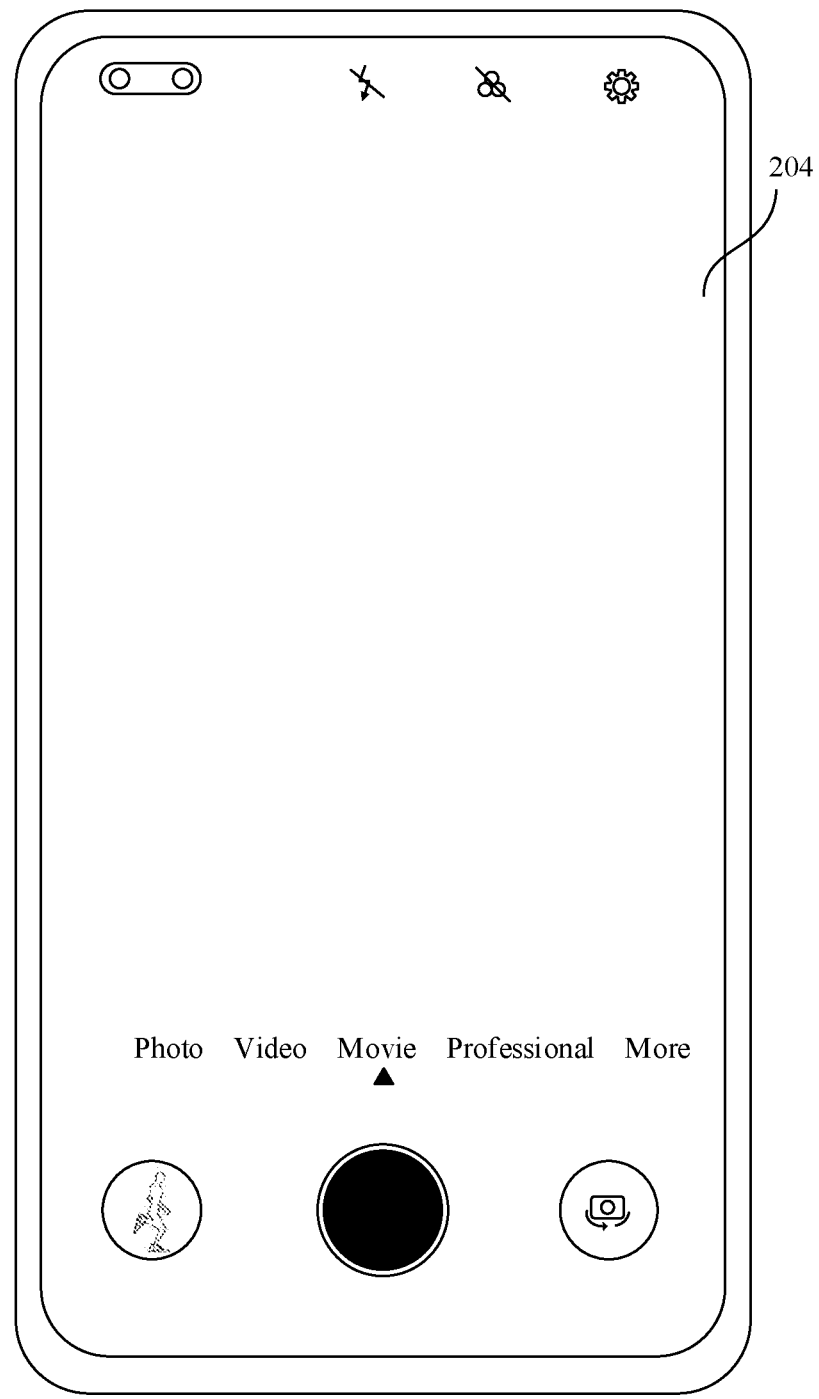
FIG. 5A(3)

IMAGE PROCESSING METHOD AND ELECTRONIC DEVICE

CROSS-REFERENCE TO RELATED APPLICATIONS

This application is a U.S. National Stage of International Application No. PCT/CN2022/113363 filed on Aug. 18, 2022, which claims priority to Chinese Patent Application No. 202111176340.6, filed on Oct. 9, 2021 and Chinese Patent Application No. 202210112240.5, filed on Jan. 29, 2022. The aforementioned applications are hereby incorporated by reference in their entireties.

TECHNICAL FIELD

This application relates to the field of image application technologies, and in particular, to an image processing method and an electronic device.

BACKGROUND

Currently, an increasing quantity of people use electronic devices (such as mobile phones) to capture photos and videos to record bits and pieces of life. To improve photographing performance of an electronic device (for example, to enrich focal lengths and photographing functions of electronic devices and improve imaging quality), the electronic device may capture photos and videos by using a plurality of cameras. The plurality of cameras have different functions. For example, the plurality of cameras may include a wide-angle camera, a telephoto camera, and a bokeh camera. In this way, the plurality of cameras may be combined to capture photos and videos to improve the photographing performance of the electronic device.

However, when the plurality of cameras are combined to capture photos and videos, parameters (for example, a focal length and a field of view) of different cameras are different. Therefore, when the electronic device captures photos and videos by using the plurality of cameras, dynamic ranges of finally generated photos or videos are different, resulting in poor effect of photos or videos.

SUMMARY

This application provides an image processing method and an electronic device. In a scenario in which an electronic device starts a plurality of cameras for photographing, details of images or videos captured by the plurality of cameras can be enriched, to improve photographing effect of the electronic device.

To achieve the foregoing technical objective, the following technical solutions are used in this application:

According to a first aspect, an image processing method is provided, and is applied to an electronic device, where the electronic device includes a first camera and a second camera, and the method includes: displaying, by the electronic device, a first preview image in response to an operation of starting the first camera by a user, where the first preview image is generated based on a first long-exposure image frame, and the first long-exposure image frame is generated by the electronic device by performing fusion on a first image frame and a second image frame; and determining, by the electronic device, a target zoom ratio in response to a zoom operation input by the user, starting the second camera, and displaying a second preview image corresponding to the target zoom ratio, where when the target zoom ratio is greater than or equal to a first preset value and less than or equal to a second preset value, the second preview image is generated through fusion of a second long-exposure image frame and a third long-exposure image frame, the second long-exposure image frame is generated by the electronic device by performing fusion on a third image frame and a fourth image frame, and the third long-exposure image frame is generated by the electronic device by performing fusion on a fifth image frame and a sixth image frame, where exposure duration of the first image frame, the third image frame, and the fifth image frame is first exposure duration, exposure duration of the second image frame, the fourth image frame, and the sixth image frame is second exposure duration, and the first exposure duration is different from the second exposure duration; and the first image frame, the second image frame, the third image frame, and the fourth image frame are captured by the first camera, and the fifth image frame and the sixth image frame are captured by the second camera.

Based on the first aspect, first, the electronic device displays the first preview image in response to the operation of starting the first camera by the user. Then, when the user inputs the zoom operation, the electronic device determines the target zoom ratio, starts the second camera, and displays the second preview image corresponding to the target zoom ratio. The second preview image is generated through fusion of the second long-exposure image frame and the third long-exposure image frame. The second long-exposure image frame is generated by the electronic device by performing fusion on the third image frame and the fourth image frame. The third long-exposure image frame is generated by the electronic device by performing fusion on the fifth image frame and the sixth image frame. In addition, the exposure duration of the first image frame, the third image frame, and the fifth image frame is the first exposure duration, the exposure duration of the second image frame, the fourth image frame, and the sixth image frame is the second exposure duration, and the first exposure duration is different from the second exposure duration. The third image frame and the fourth image frame are captured by the first camera, and the fifth image frame and the sixth image frame are captured by the second camera. That is, because the first camera and the second camera capture raw image frames (namely, the third image frame, the fourth image frame, the fifth image frame, and the sixth image frame) in a same exposure mode, dynamic ranges of the second long-exposure image frame and the third long-exposure image frame that are generated by the electronic device by performing fusion on the raw image frames captured by the first camera and the second camera are the same. On this basis, the electronic device generates the second preview image by performing fusion on the second long-exposure image frame and the third long-exposure image frame, so that the second preview image has richer details and better effect.

In a possible implementation of the first aspect, the method further includes: when the target zoom ratio is greater than or equal to a third preset value and less than or equal to a fourth preset value, the second preview image is generated based on the second long-exposure image frame, where the fourth preset value is less than the first preset value.

It should be noted that, in this embodiment, when the target zoom ratio is greater than or equal to a third preset value and less than or equal to a fourth preset value, the second preview image is generated based on the second long-exposure image frame, and the second long-exposure image frame is generated through fusion of the third image frame and the fourth image frame that are captured by the first camera. In other words, in this embodiment, when the target zoom ratio is small, the second preview image is generated through fusion of raw image frames captured by the first camera. On this basis, the second preview image may alternatively be generated based on the first long-exposure image frame. For example, the third preset value may be 1×, and the fourth preset value may be 4.4×. When the target zoom ratio is 1×, the electronic device may generate the second preview image based on the first long-exposure image frame.

In this design manner, when the target zoom ratio is greater than or equal to the third preset value and less than or equal to the fourth preset value, the second preview image is generated based on the second long-exposure image frame. When the fourth preset value is less than the first preset value, that is, when the target zoom ratio is small, the electronic device generates the second preview image through fusion of raw image frames (namely, the third image frame and the fourth image frame) captured by the first camera. This helps reduce power consumption of the device.

In a possible implementation of the first aspect, the method further includes: when the target zoom ratio is greater than or equal to a fifth preset value, the second preview image is generated based on the third long-exposure image frame, where the fifth preset value is greater than the second preset value.

In this design manner, when the target zoom ratio is greater than or equal to the fifth preset value, the second preview image is generated based on the third long-exposure image frame. When the fifth preset value is greater than the second preset value, that is, when the target zoom ratio is large, the electronic device generates the second preview image through fusion of raw image frames (namely, the fifth image frame and the sixth image frame) captured by the second camera. This helps reduce power consumption of the device.

In a possible implementation of the first aspect, the starting, by the electronic device, the second camera includes: when the target zoom ratio is greater than a first preset zoom ratio, starting, by the electronic device, the second camera.

In this design manner, the electronic device starts the second camera only when the target zoom ratio is greater than the first preset zoom ratio. This helps further reduce power consumption of the device.

In a possible implementation of the first aspect, the second preview image is a video preview image, and the method further includes: displaying, by the electronic device, a first interface, where the first interface is a preview interface during photographing, and the first interface includes a recording control; and generating, by the electronic device, a video file in response to an operation performed by the user on the recording control, where the video file is generated by the electronic device by performing fusion on the second long-exposure image frame and the third long-exposure image frame.

It should be noted that, in this embodiment, the video file generated by the electronic device is further related to the target zoom ratio. For example, when the target zoom ratio is greater than or equal to the third preset value and less than or equal to the fourth preset value, the video file is generated by the electronic device by performing fusion on the second long-exposure image frame. When the target zoom ratio is greater than or equal to the fifth preset value, the video file is generated by the electronic device by performing fusion on the third long-exposure image frame.

In this design manner, because the first camera and the second camera of the electronic device capture raw image frames in a same exposure mode, the second preview image generated by the electronic device by performing fusion on the raw image frames captured by the first camera and the second camera have richer details. Further, when the second preview image is a video preview image, the electronic device starts to record a video in response to an operation performed by the user on the recording control, so that a video recorded by the electronic device can have richer details and better effect.

In a possible implementation of the first aspect, the second preview image is a preview image on the electronic device during video recording.

In this design manner, because the first camera and the second camera of the electronic device capture raw image frames in a same exposure mode, the second preview image generated by the electronic device by performing fusion on the raw image frames captured by the first camera and the second camera have richer details. Further, when the second preview image is a preview image on the electronic device during video recording, the preview image on the electronic device during video recording can have richer details and better effect.

In a possible implementation of the first aspect, the second preview image is a photo preview image, and the method further includes: displaying, by the electronic device, a second interface, where the second interface is a preview interface during photographing, and the second interface includes a photo control; and generating, by the electronic device, a photo file in response to an operation performed by the user on the photo control, where the photo file is generated by the electronic device by performing fusion on the second long-exposure image frame and the third long-exposure image frame.

It should be noted that, in this embodiment, the photo file generated by the electronic device is further related to the target zoom ratio. For example, when the target zoom ratio is greater than or equal to the third preset value and less than or equal to the fourth preset value, the photo file is generated by the electronic device by performing fusion on the second long-exposure image frame. When the target zoom ratio is greater than or equal to the fifth preset value, the photo file is generated by the electronic device by performing fusion on the third long-exposure image frame.

In this design manner, because the first camera and the second camera of the electronic device capture raw image frames in a same exposure mode, the second preview image generated by the electronic device by performing fusion on the raw image frames captured by the first camera and the second camera have richer details. Further, when the second preview image is a photo preview image, the electronic device generates a photo file in response to an operation performed by the user on the photo control, so that the generated photo file can have richer details and better effect.

In a possible implementation of the first aspect, before the displaying a second preview image corresponding to the target zoom ratio, the method further includes: performing, by the electronic device, image conversion on the second long-exposure image frame and the third long-exposure image frame, where the image conversion includes: converting, by the electronic device, the second long-exposure image frame into a second long-exposure image frame in a target format, and converting the third long-exposure image frame into a third long-exposure image frame in a target format, where bandwidth for the second long-exposure image frame during transmission is higher than that for the second long-exposure image frame in the target format during transmission, and bandwidth for the third long-exposure image frame during transmission is higher than that for the third long-exposure image frame in the target format during transmission.

In this design manner, before displaying the second preview image corresponding to the target zoom ratio, the electronic device performs image conversion on the second long-exposure image frame and the third long-exposure image frame. To be specific, the electronic device converts the second long-exposure image frame into the second long-exposure image frame in the target format, and converting the third long-exposure image frame into the third long-exposure image frame in the target format. The bandwidth for the second long-exposure image frame during transmission is higher than that for the second long-exposure image frame in the target format during transmission, and the bandwidth for the third long-exposure image frame during transmission is higher than that for the third long-exposure image frame in the target format during transmission. Therefore, bandwidth for the second long-exposure image frame and the third long-exposure image frame during transmission can be reduced. This helps reduce power consumption of the device. In a possible implementation of the first aspect, the electronic device includes N consecutive second long-exposure image frames and M consecutive third long-exposure image frames, N≥1, M≥1, and the image conversion further includes: in the N consecutive second long-exposure image frames, if local information in a second long-exposure image frame at an $n^{th}$ moment does not meet a preset condition, repairing, by the electronic device, local information in second long-exposure image frames at an $(n-1)^{th}$ moment and an $(n+1)^{th}$ moment, where n≥2; and/or in the M consecutive third long-exposure image frames, if local information in a third long-exposure image frame at an $m^{th}$ moment does not meet a preset condition, repairing, by the electronic device, local information in third long-exposure image frames at an $(m-1)^{th}$ moment and an $(m+1)^{th}$ moment, where m≥2, where the local information includes at least one of a colors, a texture, or a shape.

In this design manner, when local information of a second long-exposure image frame at a current moment is insufficient, the electronic device may supplement the local information based on a second long-exposure image frame at a previous moment and a second long-exposure image frame at a next moment; or when local information of a third long-exposure image frame at a current moment is insufficient, the electronic device may supplement the local information based on a third long-exposure image frame at a previous moment and a third long-exposure image frame at a next moment, to further improve image display effect.

In a possible implementation of the first aspect, the method further includes: processing, by the electronic device, the second long-exposure image frame in the target format and the third long-exposure image frame in the target format by using a multicamera smoothing algorithm, where the multicamera smoothing algorithm is used for reducing noise or distortion of the second long-exposure image frame in the target format and the third long-exposure image frame in the target format.

In this design manner, the electronic device processes the second long-exposure image frame in the target format and the third long-exposure image frame in the target format by using the multicamera smoothing algorithm. This helps reduce noise or distortion of the second long-exposure image frame in the target format and the third long-exposure image frame in the target format.

In a possible implementation of the first aspect, the method further includes: processing, by the electronic device, the second long-exposure image frame in the target format and the third long-exposure image frame in the target format by using a first preset algorithm, where the processing by using the first preset algorithm includes at least one of image simulation and transformation processing, multi-frame high-dynamic-range image processing, or gamma processing.

In this design manner, the electronic device processes the second long-exposure image frame in the target format and the third long-exposure image frame in the target format by using the first preset algorithm. Because the processing by using the first preset algorithm includes at least one of the image simulation and transformation processing, the multi-frame high-dynamic-range image processing, or the gamma processing, the electronic device can further improve a dynamic range of an image by using the first preset algorithm.

In a possible implementation of the first aspect, the method further includes: after the electronic device displays the second preview image, caching, by the electronic device, an image frame captured by the first camera to a first photo queue, and caching an image frame captured by the second camera to a second photo queue.

In a possible implementation of the first aspect, the generating, by the electronic device, a photo file in response to an operation performed by the user on the photo control includes: selecting, by the electronic device, a first image from the first photo queue and selecting a second image from the second photo queue in response to an operation performed by the user on the photo control, where the first image is the latest frame of image among all images in the first photo queue, and the second image is the latest frame of image among all images in the second photo queue; and processing, by the electronic device, the first image and the second image by using a second preset algorithm, to generate a photo file in a target image format, where the processing by using the second preset algorithm is used for retaining details in the first image and the second image.

In this design manner, during photographing by the electronic device, the electronic device selects the first image from the first photo queue, and selects the second image from the second photo queue. The first image is the latest frame of image among all the images in the first photo queue, and the second image is the latest frame of image among all the images in the second photo queue. Therefore, when the electronic device processes the first image and the second image by using the second preset algorithm to generate the photo file in the target image format, a delay for generating the photo file can be reduced.

In a possible implementation of the first aspect, the method further includes: processing, by the electronic device, the first image and the second image by using a third preset algorithm, where the third preset algorithm is used for performing fusion on a field of view of the first image and a field of view of the second image.

In this design manner, the electronic device processes the first image and the second image by using the third preset algorithm. Because the third preset algorithm is used for performing fusion on the field of view of the first image and the field of view of the second image, image effect of the generated photo file can be further improved.

In a possible implementation of the first aspect, the processing, by the electronic device, the first image and the second image by using a second preset algorithm includes: processing, by the electronic device, a first target image in the first photo queue and a second target image in the second photo queue by using the second preset algorithm, where a timestamp of the first target image is the same as a timestamp of the second target image, or a difference between a timestamp of the first target image and a timestamp of the second target image is less than a preset value.

In this design manner, when the electronic device processes the first target image in the first photo queue and the second target image in the second photo queue by using the second preset algorithm, because the timestamp of the first target image is the same as the timestamp of the second target image, or the difference between the timestamp of the first target image and the timestamp of the second target image is less than the preset value, power consumption of the device can be further reduced.

According to a second aspect, an electronic device is provided. The electronic device has a function of implementing the first aspect. The function may be implemented by hardware, or may be implemented by hardware executing corresponding software. The hardware or the software includes one or more modules corresponding to the function.

According to a third aspect, an electronic device is provided. The electronic device includes a display, a memory, and one or more processors. The display and the memory are coupled to the processor. The memory is configured to store computer program code, and the computer program code includes computer instructions. When the computer instructions are executed by the processor, the electronic device is enabled to perform the following steps: displaying, by the electronic device, a first preview image in response to an operation of starting the first camera by a user, where the first preview image is generated based on a first long-exposure image frame, and the first long-exposure image frame is generated by the electronic device by performing fusion on a first image frame and a second image frame; and determining, by the electronic device, a target zoom ratio in response to a zoom operation input by the user, starting the second camera, and displaying a second preview image corresponding to the target zoom ratio, where when the target zoom ratio is greater than or equal to a first preset value and less than or equal to a second preset value, the second preview image is generated through fusion of a second long-exposure image frame and a third long-exposure image frame, the second long-exposure image frame is generated by the electronic device by performing fusion on a third image frame and a fourth image frame, and the third long-exposure image frame is generated by the electronic device by performing fusion on a fifth image frame and a sixth image frame, where exposure duration of the first image frame, the third image frame, and the fifth image frame is first exposure duration, exposure duration of the second image frame, the fourth image frame, and the sixth image frame is second exposure duration, and the first exposure duration is different from the second exposure duration; and the first image frame, the second image frame, the third image frame, and the fourth image frame are captured by the first camera, and the fifth image frame and the sixth image frame are captured by the second camera.

In a possible design of the third aspect, when the computer instructions are executed by the processor, the electronic device is further enabled to perform the following step: when the target zoom ratio is greater than or equal to a third preset value and less than or equal to a fourth preset value, the second preview image is generated based on the second long-exposure image frame, where the fourth preset value is less than the first preset value.

In a possible design of the third aspect, when the computer instructions are executed by the processor, the electronic device is further enabled to perform the following step: when the target zoom ratio is greater than or equal to a fifth preset value, the second preview image is generated based on the third long-exposure image frame, where the fifth preset value is greater than the second preset value.

In a possible design of the third aspect, when the computer instructions are executed by the processor, the electronic device is specifically enabled to perform the following step: when the target zoom ratio is greater than a first preset zoom ratio, starting, by the electronic device, the second camera.

In a possible design of the third aspect, the second preview image is a video preview image, and when the computer instructions are executed by the processor, the electronic device is further enabled to perform the following steps: displaying, by the electronic device, a first interface, where the first interface is a preview interface during photographing, and the first interface includes a recording control; and generating, by the electronic device, a video file in response to an operation performed by the user on the recording control, where the video file is generated by the electronic device by performing fusion on the second long-exposure image frame and the third long-exposure image frame.

In a possible design of the third aspect, the second preview image is a preview image on the electronic device during video recording.

In a possible design of the third aspect, the second preview image is a photo preview image, and when the computer instructions are executed by the processor, the electronic device is further enabled to perform the following steps: displaying, by the electronic device, a second interface, where the second interface is a preview interface during photographing, and the second interface includes a photo control; and generating, by the electronic device, a photo file in response to an operation performed by the user on the photo control, where the photo file is generated by the electronic device by performing fusion on the second long-exposure image frame and the third long-exposure image frame.

In a possible design of the third aspect, when the computer instructions are executed by the processor, the electronic device is further enabled to perform the following step: performing, by the electronic device, image conversion on the second long-exposure image frame and the third long-exposure image frame, where the image conversion includes: converting, by the electronic device, the second long-exposure image frame into a second long-exposure image frame in a target format, and converting the third long-exposure image frame into a third long-exposure image frame in a target format, where bandwidth for the second long-exposure image frame during transmission is higher than that for the second long-exposure image frame in the target format during transmission, and bandwidth for the third long-exposure image frame during transmission is higher than that for the third long-exposure image frame in the target format during transmission.

In a possible design of the third aspect, the electronic device includes N consecutive second long-exposure image frames and M consecutive third long-exposure image frames, $N \geq 1$, $M \geq 1$, and when the computer instructions are executed by the processor, the electronic device is further enabled to perform the following steps: in the N consecutive second long-exposure image frames, if local information in a second long-exposure image frame at an $n^{th}$ moment does not meet a preset condition, repairing, by the electronic device, local information in second long-exposure image frames at an $(n-1)^{th}$ moment and an $(n+1)^{th}$ moment, where n≥2; and/or in the M consecutive third long-exposure image frames, if local information in a third long-exposure image frame at an $m^{th}$ moment does not meet a preset condition, repairing, by the electronic device, local information in third long-exposure image frames at an $(m-1)^{th}$ moment and an $(m+1)^{th}$ moment, where m≥2, where the local information includes at least one of a colors, a texture, or a shape.

In a possible design of the third aspect, when the computer instructions are executed by the processor, the electronic device is further enabled to perform the following step: processing, by the electronic device, the second long-exposure image frame in the target format and the third long-exposure image frame in the target format by using a multicamera smoothing algorithm, where the multicamera smoothing algorithm is used for reducing noise or distortion of the second long-exposure image frame in the target format and the third long-exposure image frame in the target format.

In a possible design of the third aspect, when the computer instructions are executed by the processor, the electronic device is further enabled to perform the following step: processing, by the electronic device, the second long-exposure image frame in the target format and the third long-exposure image frame in the target format by using a first preset algorithm, where the processing by using the first preset algorithm includes at least one of image simulation and transformation processing, multi-frame high-dynamic-range image processing, or gamma processing.

In a possible design of the third aspect, when the computer instructions are executed by the processor, the electronic device is specifically enabled to perform the following steps: selecting, by the electronic device, a first image from the first photo queue and selecting a second image from the second photo queue in response to an operation performed by the user on the photo control, where the first image is the latest frame of image among all images in the first photo queue, and the second image is the latest frame of image among all images in the second photo queue; and processing, by the electronic device, the first image and the second image by using a second preset algorithm, to generate a photo file in a target image format, where the processing by using the second preset algorithm is used for retaining details in the first image and the second image.

In a possible design of the third aspect, when the computer instructions are executed by the processor, the electronic device is further enabled to perform the following step: processing, by the electronic device, the first image and the second image by using a third preset algorithm, where the third preset algorithm is used for performing fusion on a field of view of the first image and a field of view of the second image.

In a possible design of the third aspect, when the computer instructions are executed by the processor, the electronic device is specifically enabled to perform the following step: processing, by the electronic device, a first target image in the first photo queue and a second target image in the second photo queue by using the second preset algorithm, where a timestamp of the first target image is the same as a timestamp of the second target image, or a difference between a timestamp of the first target image and a timestamp of the second target image is less than a preset value.

According to a fourth aspect, a computer-readable storage medium is provided. The computer-readable storage medium stores computer instructions. When the computer instructions run on a computer, the computer is enabled to perform the image processing method according to any one of the implementations of the first aspect.

According to a fifth aspect, a computer program product including instructions is provided. When the instructions run on a computer, the computer is enabled to perform the image processing method according to any one of the implementations of the first aspect.

For technical effect of any one of the design manners in the second aspect to the fourth aspect, refer to the technical effect of different design manners in the first aspect. Details are not described herein again.

BRIEF DESCRIPTION OF DRAWINGS

FIG. 5A(1), FIG. 5A(2), and FIG. 5A(3) are a schematic diagram of a process of entering a video mode by a mobile phone according to an embodiment of this application;

DESCRIPTION OF EMBODIMENTS

Figures 1, 2A, 2B:
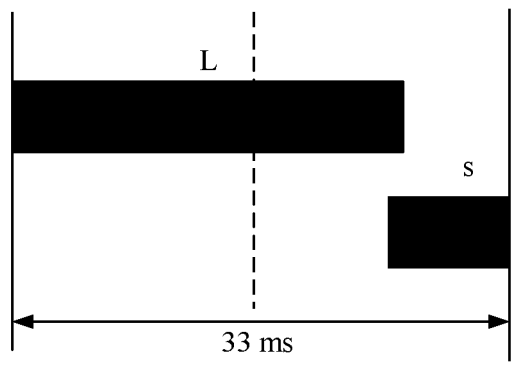
FIG. 1 is a schematic diagram of an overlapping exposure mode according to an embodiment of this application.
FIG. 2A is a schematic diagram of composition of a pixel unit according to an embodiment of this application.
FIG. 2B is a schematic diagram of composition of a red subpixel according to an embodiment of this application.

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In descriptions of the embodiments, unless otherwise stated, "a plurality of" means two or more.

In the related art, an electronic device may capture images by using one or more cameras. For example, the electronic device captures images by using one camera. For example, the electronic device starts a primary camera (or referred to as a primary camera) to capture raw image frames. Then the electronic device encodes the raw image frames captured by the primary camera to generate a preview image. For example, the electronic device captures images by using two cameras. For example, the electronic device starts both a primary camera (or referred to as a primary camera) and a secondary camera (or referred to as a secondary camera) to capture raw image frames. Then the electronic device performs fusion on the raw image frames captured by the primary camera and the secondary camera to generate a preview image.

However, in some embodiments, because parameters of the primary camera and the secondary camera are different, the primary camera can capture a plurality of raw image frames (or referred to as a multi-frame image) in one exposure cycle, but the secondary camera can capture only one raw image frame (or referred to as a single-frame image) in one exposure cycle. As a result, due to a limited dynamic range of the single-frame image, dynamic ranges of raw image frames captured by the primary camera and raw image frames captured by the secondary camera are different. Consequently, a preview image obtained through fusion of the raw image frames captured by the primary camera and the raw image frames captured by the secondary camera does not have rich details or good effect. Further, the preview image may be a photo preview image or a video preview image. On this basis, after a user taps a photo control (or a video control), the electronic device may encode the photo preview image to generate a photo file. Correspondingly, the electronic devices may alternatively encode the video preview image to generate a video file. In this case, the generated photo file (or video file) does not have rich details or good effect either.

That parameters of the primary camera and the secondary camera are different may be that focal lengths of the primary camera and the secondary camera are different (for example, the primary camera is a wide-angle camera, and the secondary camera is a telephoto camera), fields of view (field of view, FOV) of the primary camera and the secondary camera are different, or the like.

Based on this, the embodiments of this application provide an image processing method. The method may be applied to an electronic device with a plurality of cameras. In the method, dynamic ranges of raw image frames captured by all of the plurality of cameras can be the same. Then the electronic device may perform same dynamic image algorithm synthesis processing on the raw image frames captured by all the cameras, so that processed raw image frames have richer image details, and a preview image generated through fusion of the raw image frames captured by all the cameras has richer details. This helps improve photographing effect of the electronic device.

In some embodiments, the electronic device may process, by using a same high-dynamic range (High-Dynamic Range, HDR for short) image algorithm, the raw image frames captured by all the cameras. The HDR can provide more dynamic ranges and image details. It should be noted that a dynamic range is a ratio of a maximum value of a variable signal to a minimum value of the variable signal, and a dynamic range in an image is a ratio of a brightness value of a brightest object in the image to a brightness value of a darkest object in the image. A greater ratio of the brightness value of the brightest object in the image to the brightness value of the darkest object in the image indicates that more levels of image brightness are presented on the image. In this case, brightness displayed in the image is closer to brightness in a real photographing environment. Due to a large dynamic range of the image, the image can present more brightness states, so that the image has richer details.

For example, the electronic device may include two cameras. For example, the electronic device includes a primary camera (or referred to as a primary camera) and a secondary camera (or referred to as a secondary camera). On this basis, to enable the raw image frames captured by the primary camera and the secondary camera to have a same dynamic range, in some embodiments, the primary camera and the secondary camera may capture raw images in a same exposure mode. Then the electronic device synthesizes, by using an HDR algorithm, the raw image frames captured by the primary camera and the secondary camera, to enrich details of the raw image frames captured by the primary camera and the secondary camera.

It should be noted that the raw image frames captured by the primary camera and the secondary camera can be, for example, low dynamic range (low dynamic range, LDR) images.

In some embodiments, an exposure mode for capturing raw image frames by the primary camera and the secondary camera is an overlapping exposure mode. For example, the primary camera and the secondary camera may capture the raw image frames in a 2× (or referred to as 2-exp) overlapping exposure mode. Specifically, the 2-exp overlapping exposure mode is as follows: In one exposure cycle, the electronic device may control the camera to separately perform exposure by using two periods of exposure duration, and capture an image frame within each period of exposure duration. In some embodiments, the two periods of exposure duration may not be equal. For example, the two periods of exposure duration include long-exposure duration and short-exposure duration. The electronic device may capture image frames by performing exposure alternately based on the long-exposure duration and the short-exposure duration. Based on the overlapping exposure mode, the electronic device may capture two columns of image frames. For example, the electronic device captures a long-exposure image frame within the long-exposure duration, and captures a short-exposure image frame within the short-exposure duration.

For example, FIG. 1 is a schematic diagram of a staggered exposure mode according to an embodiment of this application. As shown in FIG. 1, for example, long-exposure duration may be denoted as L, and short-exposure duration may be denoted as S. For example, an example in which duration of one exposure cycle is 33 ms (milliseconds) is used for description. If the camera of the electronic device captures image frames at a rate of 30 fps (frames per second), maximum long-exposure duration may be 30 ms, and minimum short-exposure duration may be 5 ms. In this way, the camera can capture a column of image frames within 30 ms, and capture a column of image frames within 5 ms. That is, the camera can capture two columns of image frames within one exposure cycle.

An example in which the electronic device includes two cameras (for example, a primary camera and a secondary camera) is used for description. The primary camera captures a first image frame within long-exposure duration (for example, 30 ms), and captures a second image frame within short-exposure duration (for example, 5 ms). The secondary camera captures a third image frame within long-exposure duration (for example, 30 ms), and captures a fourth image frame within short-exposure duration (for example, 5 ms). In some embodiments, the electronic device may synthesize, by using an HDR algorithm, the first image frame and the second image frame captured by the primary camera to generate a first long-exposure image frame. In addition, the electronic device synthesizes, by using an HDR algorithm, the third image frame and the fourth image frame captured by the secondary camera to generate a second long-exposure image frame. The first long-exposure image frame and the second long-exposure image frame have HDR effect. To be specific, the first long-exposure image frame and the second long-exposure image frame have a larger dynamic range and richer image details. Then the electronic device transmits the first long-exposure image frame and the second long-exposure image frame to a display, so that the display displays a preview image based on the first long-exposure image frame and the second long-exposure image frame. It should be understood that the preview image is an image with HDR effect.

It can be understood that, because both the primary camera and the secondary camera capture image frames in the overlapping exposure mode, a dynamic range of the first image frame and the second image frame captured by the primary camera is the same as that of the third image frame and the fourth image frame captured by the secondary camera. Therefore, the electronic device may synthesize the first image frame and the second image frame and synthesize the third image frame and the fourth image frame by using a same HDR algorithm, so that the synthesized first long-exposure image frame and the synthesized second long-exposure image frame have a same dynamic range, and have a larger dynamic range and more image details. That is, the first long-exposure image frame and the second long-exposure image frame have richer image details. Further, after the electronic device transmits the first long-exposure image frame and the second long-exposure image frame to the display, the preview image generated by the display based on the first long-exposure image frame and the second long-exposure image frame has richer details, thereby improving photographing effect of the electronic device.

In addition, when the electronic device capture raw image frames in the overlapping exposure mode, the camera can capture two columns of image frames in one exposure cycle in the overlapping exposure mode, where one exposure cycle includes two different periods of exposure duration. Therefore, when the electronic device performs fusion on the captured two columns of image frames into one column of image frames based on different exposure duration, image spots, or referred to as ghosts (ghost), in the image frames can be effectively reduced. The image spots are a phenomenon of overexposure or halo in image frames captured by the electronic device due to different illumination during photographing.

In some other embodiments, an exposure mode for capturing raw image frames by the primary camera and the secondary camera is a color filter array (color filter array, CFA) exposure mode. The color filter array may also be referred to as a Quad Bayer coding (Quad Bayer coding) array, namely, a QCFA. For example, as shown in FIG. 2A, the Quad Bayer coding array is a pixel unit including one red subpixel (R), two green subpixels (G), and one blue subpixel (B). The pixel unit may also be referred to as an RGGB pixel unit. Each subpixel forms a 2×2 matrix. For example, as shown in FIG. 2A, R1, R2, R3, and R4 included in the red subpixel R form a 2×2 matrix; G1, G2, G3, and G4 included in the green subpixel G form a 2×2 matrix, and G5, G6, G7, and G8 form a 2×2 matrix; and B1, B2, B3, and B4 included in the blue subpixel B to form a 2×2 matrix.

The red subpixel is used as an example for description. For example, with reference to FIG. 2A, as shown in FIG. 2B, R1 and R4 output image frames by using same exposure duration, and R2 and R3 output image frames by using different exposure duration. For example, R1 and R4 output image frames by using medium-exposure duration (M), R2 outputs an image frame by using long-exposure duration (L), and R3 outputs an image frame by using short-exposure duration (S). Correspondingly, for the green subpixel, G1 and G4 output image frames by using same exposure duration, and G2 and G3 output image frames by using different exposure duration. For example, G1 and G4 output image frames by using medium-exposure duration (M), G2 outputs an image frame by using long-exposure duration (L), and G3 outputs an image frame by using short-exposure duration (S). Correspondingly, for the blue subpixel, B1 and B4 output image frames by using same exposure duration, and B2 and B3 output image frames by using different exposure duration. For example, B1 and B4 output image frames by using medium-exposure duration (M), B2 outputs an image frame by using long-exposure duration (L), and B3 outputs an image frame by using short-exposure duration (S).

On this basis, the electronic device may synthesize, by using an HDR algorithm, the image frames output based on the long-exposure duration, the image frames output based on the medium-exposure duration, and the image frames output based on the short-exposure duration, to obtain an image frame with HDR effect, so that the synthesized image frame has a larger dynamic range and richer image details. Further, the display of the electronic device may display the preview image based on the synthesized image frame, so that the preview image has richer image details, thereby improving photographing effect of the electronic device.

It should be noted that the overlapping exposure mode and the Quad Bayer coding array-based exposure mode are only some examples of the embodiments of this application for description, and do not constitute a limitation on this application. It should be understood that any exposure mode in which raw image frames captured by the primary camera and the secondary camera can have a same dynamic range falls within the protection scope of the embodiments of this application, and other exposure modes are not listed one by one herein.

The following describes in detail the image processing method provided in the embodiments of this application with reference to the accompanying drawings in this specification.

For example, an electronic device in the embodiments of this application may be an electronic device with a photographing function. For example, the electronic device may be a motion camera (GoPro) of a mobile phone, a digital camera, a tablet computer, a desktop computer, a laptop computer, a handheld computer, a notebook computer, an in-vehicle device, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the electronic device is not particularly limited in the embodiments of this application.

Figure 3:
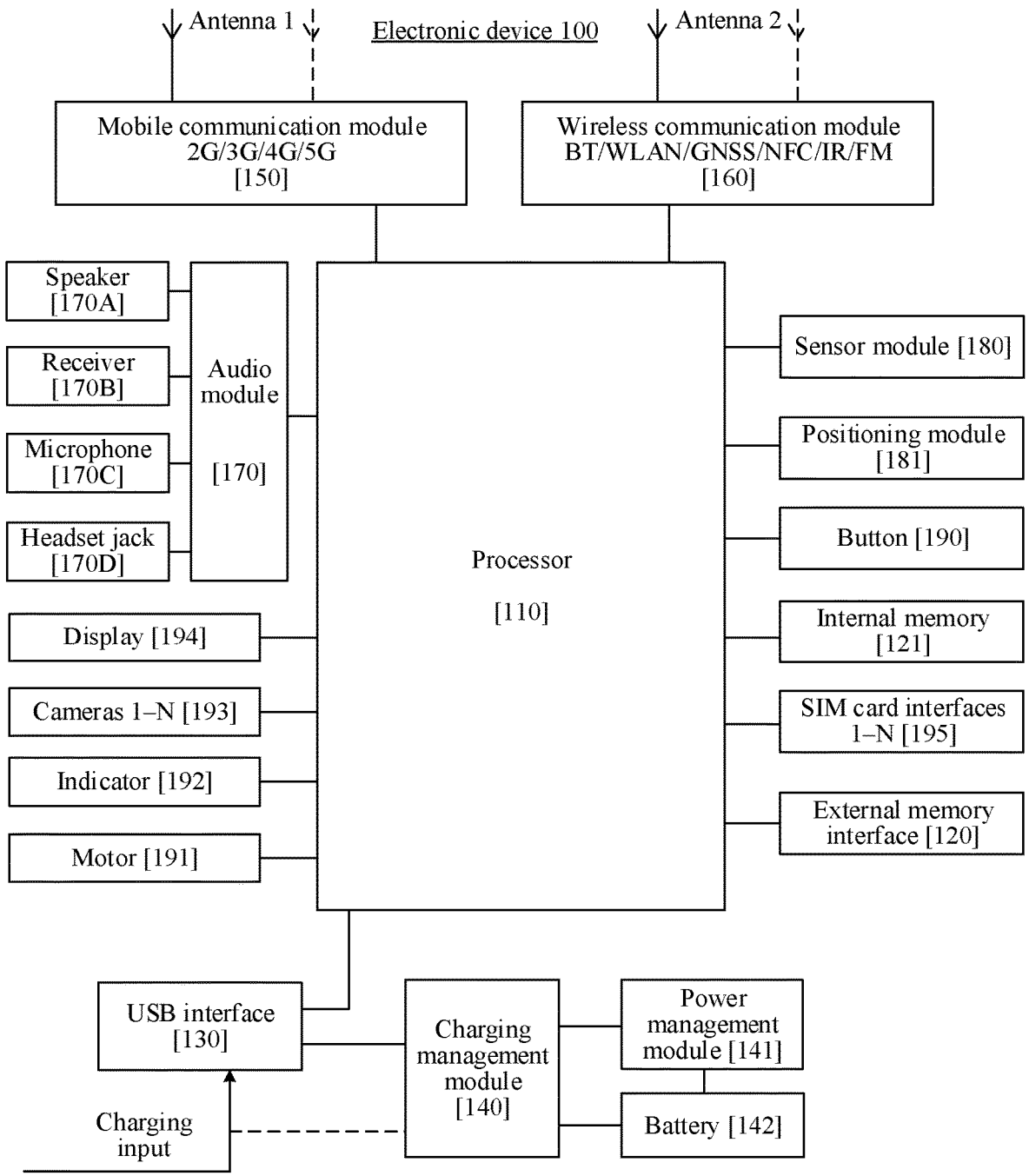
FIG. 3 is a schematic diagram of a hardware structure of an electronic device according to an embodiment of this application.

FIG. 3 is a schematic structural diagram of an electronic device 100. The electronic device 100 may include: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

It can be understood that the schematic structure in this embodiment does not constitute a specific limitation on the electronic device 100. In some other embodiments, the electronic device 100 may include more or fewer components than those shown in the figure, or some components may be combined, or some components may be split, or components may be arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device 100. The controller may generate an operation control signal based on an instruction operation code and a time sequence signal, to control instruction fetching and instruction execution.

The processor 110 may be further provided with a memory to store instructions and data. In some embodiments, the memory in the processor 110 is a cache memory. The memory may store instructions or data recently used or cyclically used by the processor 110. If the processor 110 needs to use the instructions or the data again, the processor 110 may directly call the instructions or the data from the memory. This avoids repeated access, and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It can be understood that an interface connection relationship between the modules illustrated in this embodiment is merely an example for description, and does not constitute a limitation on a structure of the electronic device. In some other embodiments, the electronic device may alternatively use an interface connection manner different from that in the foregoing embodiment, or use a combination of a plurality of interface connection manners.

The charging management module 140 is configured to receive charging input from a charger. The charger may be a wireless charger or a wired charger. In some embodiments of wired charging, the charging management module 140 may receive charging input from a wired charger through the USB interface 130. In some embodiments of wireless charging, the charging management module 140 may receive wireless charging input through a wireless charging coil of the electronic device. While the charging management module 140 charges the battery 142, the power management module 141 may further supply power to the electronic device.

The power management module 141 is connected to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communication module 150, the wireless communication module 160, the modem processor, the baseband processor, and the like.

The electronic device 100 implements a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-OLED, a micro-OLED, a quantum dot light emitting diode (quantum dot light emitting diodes, QLED), or the like.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device may include 1 or N cameras 193, where N is a positive integer greater than 1.

In this embodiment of this application, the electronic device may include two or more cameras. For example, the electronic device includes two cameras (for example, a primary camera and a secondary camera). For example, the primary camera and the secondary camera capture raw image frames in a same exposure mode. Then the electronic device synthesizes, by using an HDR algorithm, the raw image frames captured by the primary camera and the secondary camera of the electronic device, so that the raw image frames captured by the primary camera and the secondary camera of the electronic device have a larger dynamic range and richer image details.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device 100 may support one or more video codecs. In this way, the electronic device may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, with reference to a transfer mode between human brain neurons, and may further continuously perform self-learning. The NPU may implement applications such as intelligent cognition of the electronic device, for example, image recognition, facial recognition, speech recognition, and text comprehension.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110. The speaker 170A, also referred to as a "loudspeaker", is configured to convert an electrical audio signal into a sound signal. The receiver 170B, also referred to as an "earpiece", is configured to convert an electrical audio signal into a sound signal. The microphone 170C, also referred to as a "mike" or a "mic", is configured to convert a sound signal into an electrical signal.

The headset jack 170D is used for connecting a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The external memory interface 120 may be used for connecting an external storage card such as a micro SD card, to expand a storage capability of the electronic device. The external storage card communicates with the processor 110 through the external memory interface 120, to implement a data storage function. For example, files such as audio and videos are stored in the external storage card.

The internal memory 121 may be configured to store computer-executable program code. The executable program code includes instructions. The processor 110 runs the instructions stored in the internal memory 121, to perform various function applications and data processing of the electronic device. For example, in this embodiment of this application, the processor 110 may execute the instructions stored in the internal memory 121, and the internal memory 121 may include a program storage area and a data storage area.

The program storage area may store an operating system, an application required by at least one function (for example, a sound playing function or an image playing function), and the like. The data storage area may store data (for example, audio data and an address book) created during use of the electronic device, and the like. In addition, the internal memory 121 may include a high-speed random access memory, or may include a non-volatile memory such as at least one magnetic disk memory, a flash memory, or a universal flash storage (universal flash storage, UFS).

The button 190 includes a power button, a volume button, and the like. The button 190 may be a mechanical button or a touch button. The motor 191 may generate a vibration prompt. The motor 191 may be configured to provide an incoming call vibration prompt or a touch vibration feedback. The indicator 192 may be an indicator light, and may be configured to indicate a charging status and a battery level change, or may be configured to indicate a message, a missed call, a notification, and the like. The SIM card interface 195 is used for connecting a SIM card. The SIM card may be inserted into the SIM card interface 195 or removed from the SIM card interface 195, to implement contact with or separation from the electronic device. The electronic device may support one or N SIM card interfaces, where N is a positive integer greater than 1. The SIM card interface 195 may support a nano-SIM card, a micro-SIM card, a SIM card, and the like.

In this embodiment of this application, a software system of the electronic device 100 may use a hierarchical architecture, an event-driven architecture, a microkernel architecture, or a cloud architecture. In the embodiments of this application, an Android system with a hierarchical architecture is used as an example to illustrate a software structure of the electronic device 100.

Figure 4:
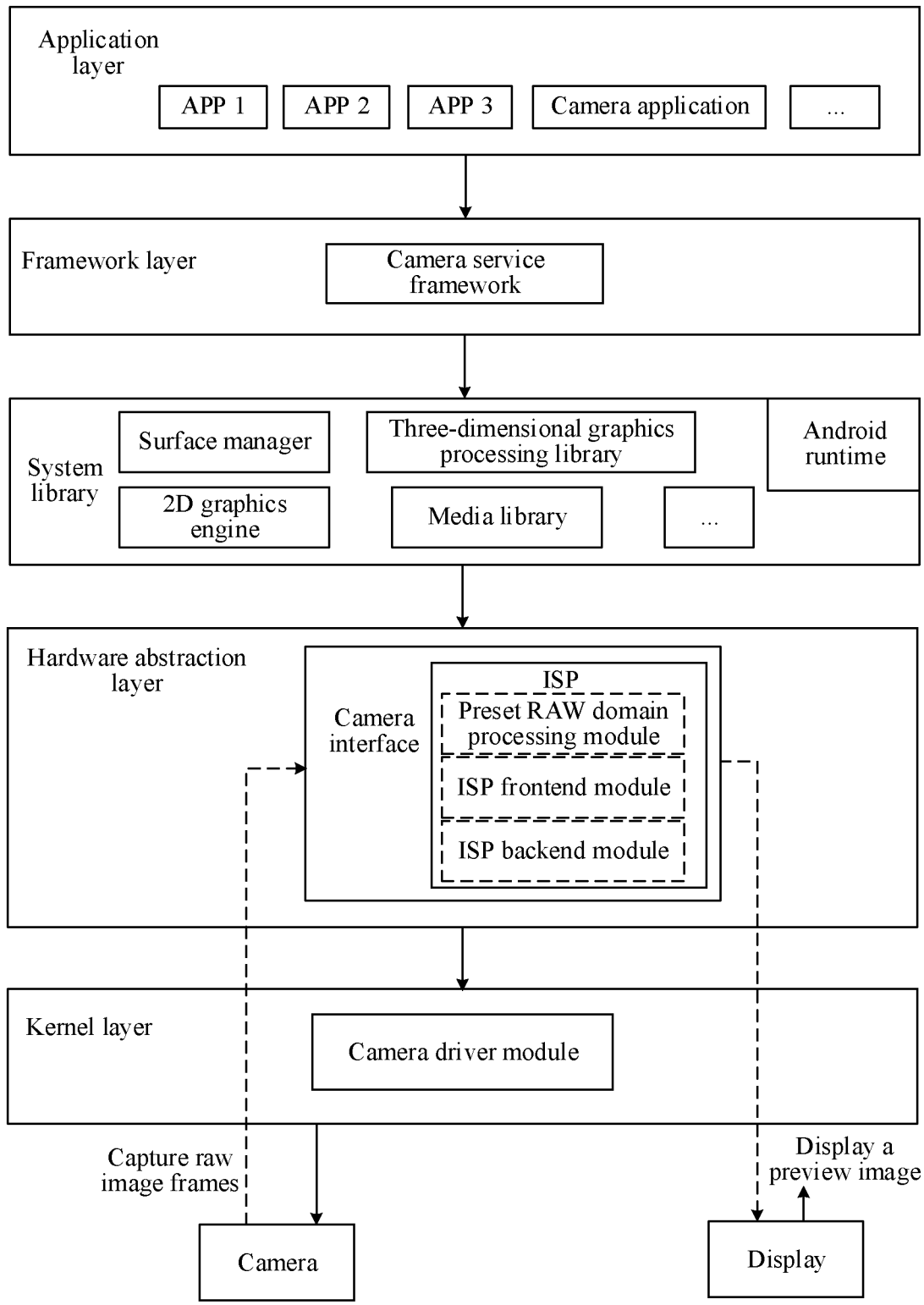
FIG. 4 is a schematic diagram of a software architecture of an electronic device according to an embodiment of this application.

FIG. 4 is a diagram of a software structure of an electronic device according to an embodiment of this application.

It can be understood that, in a hierarchical architecture, software is divided into several layers, and each layer has a clear role and task. The layers communicate with each other through a software interface. In some embodiments, the Android system may include an application (application, APP) layer, a framework (framework, FWK) layer, a hardware abstraction layer (hardware abstraction layer, HAL), and a kernel (kernel) layer. As shown in FIG. 4, the Android system may further include an Android runtime (Android runtime) and a system library. For ease of understanding, in this embodiment of this application, the diagram of the software structure shown in FIG. 4 further includes a part of the hardware structure of the electronic device shown in FIG. 3, for example, a camera and a display.

The application layer may include a series of application packages. As shown in FIG. 4, the application packages may include an APP 1, an APP 2, an APP 3, and the like. In some embodiments, the application packages may include some applications (for example, a camera application) with a photographing function. When the electronic device runs the camera application, the electronic device starts the camera, and captures raw image frames through the camera. In this embodiment of this application, the electronic device includes a plurality of cameras. For example, the electronic device includes two cameras: a primary camera and a secondary camera.

The application framework layer provides an application programming interface (application programming interface, API) and a programming framework for applications at the application layer. The application framework layer includes some predefined functions. The application framework layer provides, through the API interface, a programming service for calling by the application layer. As shown in FIG. 4, the application framework layer includes a camera service framework.

The Android runtime includes a kernel library and a virtual machine. The Android runtime is responsible for scheduling and managing the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of common audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The hardware abstraction layer is an interface layer between the kernel layer and hardware, and may be configured to abstract the hardware. For example, as shown in FIG. 4, the application abstraction layer includes a camera interface.

The kernel layer provides underlying drivers for various hardware of the electronic device. For example, as shown in FIG. 4, the kernel layer includes a camera driver module.

An image processing method provided in the embodiments of this application is described with reference to the diagram of the software structure shown in FIG. 4. In some embodiments, when a user starts the camera application, the electronic device needs to call the camera to capture raw image frames. Based on this, when the user starts the camera application, the camera application triggers a camera startup instruction. Then the camera application calls the API interface at the framework layer to send the camera startup instruction to the camera service framework, and the camera service framework calls the camera interface at the hardware abstraction layer to send the camera startup instruction to the camera driver module. The camera driver module may drive the camera to capture raw image frames.

On this basis, the camera transmits captured raw image frames to the camera interface at the hardware abstraction layer. Therefore, the camera interface synthesizes the raw image frames by using an HDR algorithm, and then transmits processed raw image frames to the display, so that the display displays a preview image. It should be understood that the processed raw image frames can provide a larger dynamic range and more image details.

For example, an ISP may be disposed in the camera interface. The camera synthesizes the raw image frames by using the HDR algorithm through the ISP. In some embodiments, the ISP includes a preset RAW domain processing module, an ISP frontend module, and an ISP backend module. For example, the camera interface may synthesize the raw image frames by using the HDR algorithm through the preset RAW domain processing module.

The preset RAW domain processing module is a module designed by using a preset RAW image processing algorithm. The preset RAW image processing algorithm is a RAW domain deep learning network for image quality enhancement. In some embodiments, the preset RAW domain processing algorithm may be a software image processing algorithm. The preset RAW domain processing algorithm may be a software algorithm in an algorithm library at the hardware abstraction layer of the electronic device. In some other embodiments, the preset RAW domain processing algorithm may be a hardware image processing algorithm. The preset RAW domain processing algorithm may be a hardware image processing algorithm implemented by calling an image processing algorithm capability of the ISP.

It should be noted that the preset RAW domain processing algorithm may alternatively be referred to as a preset image processing algorithm. The preset RAW domain processing algorithm is so named in this embodiment of this application because input for the preset RAW domain processing algorithm is a RAW domain image. Output of the preset RAW domain processing algorithm may be a RAW domain image or an RGB domain image. This is not limited in this embodiment of this application.

For example, the electronic device is a mobile phone. In some embodiments, as shown in FIG. 5A(1), in response to an operation performed by a user on an icon 201 of a "Camera" application on a home screen of the mobile phone, the mobile phone displays an interface 202 shown in FIG.

5A(2). The interface 202 is a preview interface for photographing by the mobile phone. The preview interface is used for displaying a preview image (namely, a photo preview image) during photographing by the mobile phone. For example, when the mobile phone responds to the operation performed by the user on the icon 201 of the "Camera" application, the mobile phone starts a camera (for example, starts a primary camera and a secondary camera), and then the mobile phone captures raw image frames through the primary camera and the secondary camera, and displays an image on the preview interface (namely, the interface 202). As shown in FIG. 5A(2), the interface 202 further includes a "Portrait" mode, a "Video" mode, a "Movie" mode, and a "Professional" mode. The "Video" mode and the "Movie" mode are used for recording video files. The "Professional" mode is used for taking photos. The "Movie" mode is used as an example. In some other embodiments, as shown in FIG. 5A(2), in response to an operation of selecting the "Movie" mode 203 by the user, the mobile phone displays an interface 204 shown in FIG. 5A(3). The interface 204 is a preview interface before video recording by the mobile phone. The preview interface is used for displaying a preview image (namely, a video preview image) during video recording by the mobile phone. For example, when the mobile phone responds to the operation of selecting the "Movie" mode 203 by the user, the mobile phone captures raw image frames through the camera (for example, starting the primary camera and the secondary camera), and displays an image on the preview interface (namely, the interface 204).

It should be noted that, in this embodiment of this application, regardless of whether the electronic device is in a photographing state or a video recording state, after the electronic device captures raw image frames through the primary camera and the secondary camera, the raw image frames captured by the primary camera and the secondary camera are synthesized by using a same HDR algorithm, and a synthesized image is finally displayed on the preview interface. After synthesis by using the HDR algorithm, the preview image (for example, the photo preview images and the video preview images) displayed on the preview interface has a larger dynamic range and more image details.

Figure 5B:
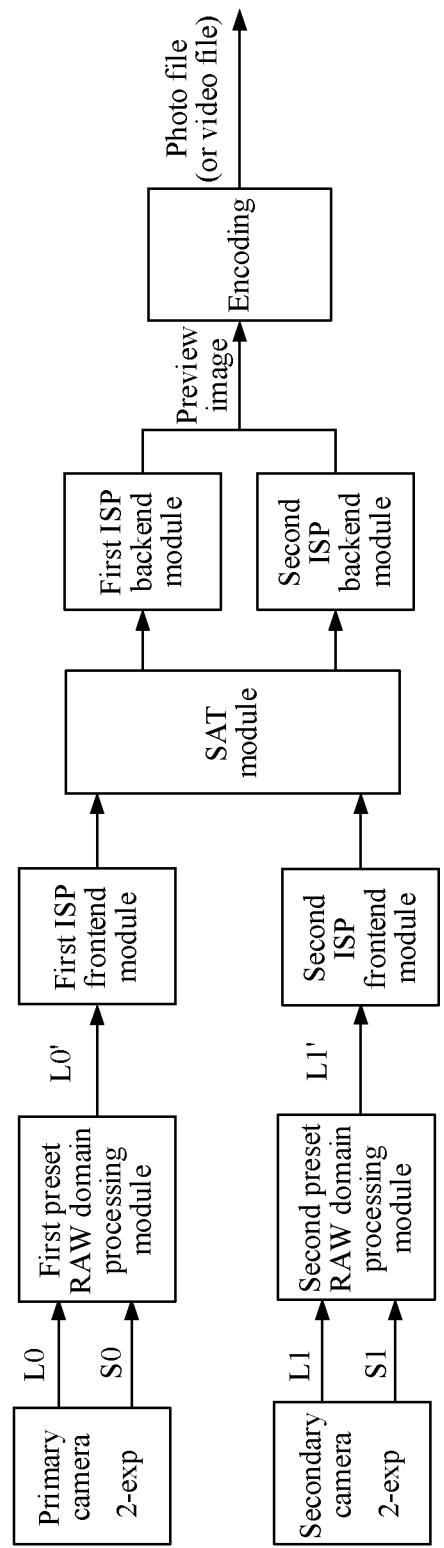
FIG. 5B is a first schematic flowchart of image processing according to an embodiment of this application.

A specific process of the image processing method provided in the embodiments of this application is described by using an example in which the electronic device includes two cameras, the two cameras are a primary camera and a secondary camera, and the primary camera and the secondary camera capture raw image frames in a 2-exp overlapping exposure mode. As shown in FIG. 5B, the primary camera is connected to a first preset RAW domain processing module, and the first preset RAW domain processing module is connected to a first ISP frontend module. The secondary camera is connected to a second preset RAW domain processing module, and the second preset RAW domain processing module is connected to a second ISP frontend module. Still as shown in FIG. 5B, the first ISP frontend module and the second ISP frontend module are separately connected to a multicamera smoothing algorithm (satisfiability, SAT) module. The SAT module is connected to a first ISP backend module and a second ISP backend module.

Still as shown in FIG. 5B, the primary camera captures a first image frame L0 in the overlapping exposure mode within first exposure duration, and captures a second image frame S0 within second exposure duration. The primary camera inputs the first image frame L0 and the second image frame S0 to the first preset RAW domain processing module. The first preset RAW domain processing module is configured to synthesize the first image frame L0 and the second image frame S0 by using an HDR algorithm, to generate a first long-exposure image frame L0'. Then the first preset RAW domain processing module inputs the first long-exposure image frame L0' to the first ISP frontend module. The first ISP frontend module is configured to process the first long-exposure image frame L0' in "YUV domain", to convert the first long-exposure image frame L0' into a first long-exposure image frame L0' in a YUV format. Then the first ISP frontend module transmits the first long-exposure image frame L0' in the YUV format to the SAT module. The SAT module is configured to smooth the first long-exposure image frame L0', to improve image quality of the first long-exposure image frame L0', and reduce interference (for example, reduce image noise or distortion). Then the SAT module transmits a processed first long-exposure image frame L0' to the first ISP backend module. The first ISP backend module is configured to perform image enhancement on the first long-exposure image frame L0'.

Correspondingly, still as shown in FIG. 5B, the secondary camera captures a third image frame L1 in the overlapping exposure mode within the first exposure duration, and captures a fourth image frame S1 within the second exposure duration. The secondary camera inputs the third image frame L1 and the fourth image frame S1 to the second preset RAW domain processing module. The second preset RAW domain processing module is configured to synthesize the third image frame L1 and the fourth image frame S1 by using an HDR algorithm, to generate a second long-exposure image frame L1'. Then the second preset RAW domain processing module inputs the second long-exposure image frame L1' to the second ISP frontend module. The second ISP frontend module is configured to process the second long-exposure image frame L1' in "YUV domain", to convert the second long-exposure image frame L1' into a second long-exposure image frame L1' in a YUV format. Then the second ISP frontend module transmits the second long-exposure image frame L1' in the YUV format to the SAT module. The SAT module is configured to smooth the second long-exposure image frame L1', to improve image quality of the second long-exposure image frame L1', and reduce interference. Then the SAT module transmits a processed second long-exposure image frame L1' to the second ISP backend module. The second ISP backend module is configured to perform image enhancement on the second long-exposure image frame L1'.

It should be noted that the YUV format is a type of image color coding, where Y indicates luminance (Luminance), and U and V indicate chrominance (Chrominance). It should be understood that the first long-exposure image frame L0' and the second long-exposure image frame L1' have a larger dynamic range and richer image details.

With reference to the foregoing embodiment, still as shown in FIG. 5B, the first ISP backend transmits the first long-exposure image frame L0' to the display, and the second ISP backend transmits the second long-exposure image frame L1' to the display, so that the display displays a preview image based on the first long-exposure image frame L0' and the second long-exposure image frame L1'. On this basis, after the user taps a photographing control (for example, a photo control or a video control, where the video control is used for recording video files), the electronic device encodes the first long-exposure image frame L0' and the second long-exposure image frame L1' to generate a photo file or a video file.

Figure 6:
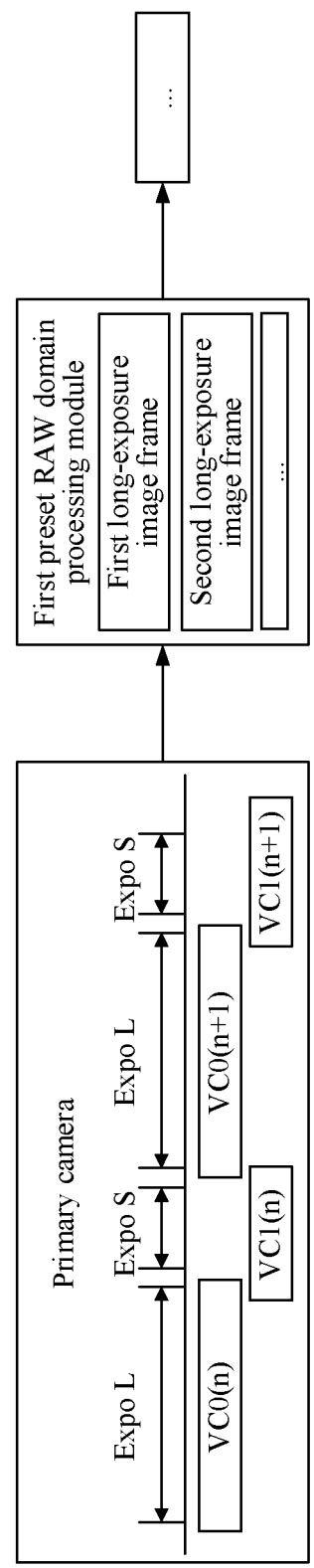
FIG. 6 is a schematic diagram of an exposure mode of a primary camera according to an embodiment of this application.

It can be learned from the foregoing embodiment that, when the camera of the electronic device captures raw image frames in the overlapping exposure mode, a complete exposure cycle includes one period of long-exposure duration (for example, denoted as Expo L) and one period of short-exposure duration (for example, denoted as Expo S). Certainly, the camera of the electronic device may capture raw image frames in a plurality of consecutive exposure cycles, and synthesize, by using an HDR algorithm, raw image frames captured by the camera in each exposure cycle. An example in which the camera of the electronic device is the primary camera and raw image frames are captured in two consecutive exposure cycles is used for description. For example, as shown in FIG. 6, the primary camera captures a long-exposure image frame VC0(n) within long-exposure duration Expo L of the $1^{st}$ exposure cycle, and captures a short-exposure image frame VC1(n) within short-exposure duration Expo S of the $1^{st}$ exposure cycle. Correspondingly, the primary camera captures a long-exposure image frame VC0(n+1) within long-exposure duration Expo L of the $2^{nd}$ exposure cycle, and captures a short-exposure image frame VC1(n+1) within short-exposure duration Expo S of the $2^{nd}$ exposure cycle. Then the primary camera transmits the long-exposure image frame VC0(n) and the short-exposure image frame VC1(n) captured in the first exposure cycle, and the long-exposure image frame VC0(n+1) and the short-exposure image frame VC1(n+1) captured in the second exposure cycle to the first preset RAW domain processing module. The first preset RAW domain processing module synthesizes the long-exposure image frame VC0(n) and the short-exposure image frame VC1(n) by using an HDR algorithm to generate a first long-exposure image frame, and synthesizes the long-exposure image frame VC0(n+1) and the short-exposure image frame VC1(n+1) by using an HDR algorithm to generate a second long-exposure image frame. In this way, the first preset RAW domain processing module includes a multi-frame image including the first long-exposure image frame and the second long-exposure image frame.

Further, after being processed by the first preset RAW domain processing module, the first long-exposure image frame and the second long-exposure image frame may be further processed by the first ISP frontend module, the SAT module, and the first ISP backend module. For a specific processing method, refer to FIG. 5B and corresponding embodiments. Details are not described herein again.

It should be noted that the camera of the electronic device may alternatively capture raw image frames in three consecutive exposure cycles, or may capture raw image frames in a plurality of (four or more) exposure cycles. For a specific capture manner, refer to the foregoing embodiments. Details are not described herein again.

In this embodiment of this application, the electronic device includes a plurality of cameras. For example, the electronic device may include a primary camera and a secondary camera. For example, the primary camera may be a medium-focus camera (or referred to as a standard camera), and the secondary camera may be a telephoto (tele) camera. In some embodiments, before the user uses the electronic device for photographing, the display of the electronic device displays an image captured by the camera, that is, the display of the electronic device displays a preview image. On this basis, the user may zoom in the preview image according to a specific requirement. For example, the user may input a zoom operation to adjust a size of the preview image displayed on the display. The zoom operation is used for triggering the display of the electronic device to display a preview image corresponding to a target zoom ratio. In some embodiments, an example in which a reference zoom ratio of the primary camera (namely, the medium-focus camera) is 1× and a reference zoom ratio of the secondary camera (namely, the telephoto camera) is 5× is used for description. For example, during photographing by the electronic device, the electronic device may start the primary camera to capture raw image frames. Before the electronic device receives a zoom operation performed by the user, a zoom ratio displayed by the electronic device is the reference zoom ratio (for example, 1×) of the primary camera. Then the primary camera of the electronic device captures raw image frames, and displays a preview image corresponding to the reference zoom ratio.

It should be noted that the zoom ratio may be an optical zoom ratio or a digital zoom ratio. For example, the zoom ratio may be 1×, 3×, 4×, 4.5×, 4.9×, or 5×. "1×" indicates that the zoom ratio is 1 time. "3×" indicates that the zoom ratio is 3 times. "4×" indicates that the zoom ratio is 4 times. In addition, the ratio in this embodiment of this application may also be referred to as a multiple. That is, the zoom ratio may also be referred to as a zoom multiple.

An example in which the electronic device is a mobile phone is used for description. During video recording by the mobile phone, the mobile phone displays an interface 301 shown in (1) in FIG. 7A. The interface 301 includes a recording control 302. In response to an operation performed by the user on the recording control 302, the mobile phone displays an interface 303 shown in (2) in FIG. 7A. The interface 303 is a viewfinder interface of the mobile phone during video recording. The interface 303 includes a pause button 304 and a recording end button 305. For example, in response to an operation performed by the user on the pause button 304, the mobile phone pauses video recording; or in response to an operation performed by the user on the recording end button 305, the mobile phone ends video recording, and stores a recorded video on the mobile phone (for example, in an album application).

Figure 7A:
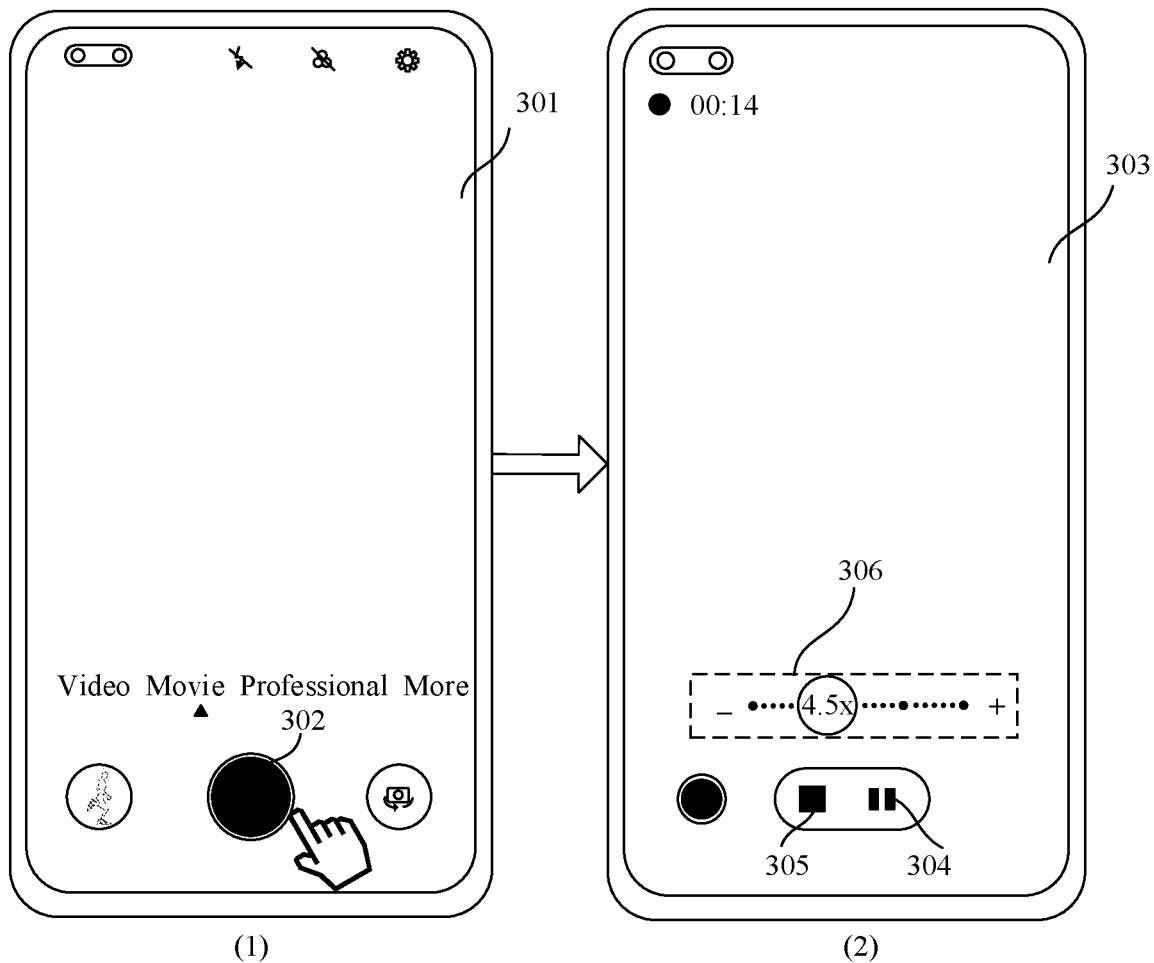
FIG. 7A is a schematic diagram of a video recording interface on a mobile phone according to an embodiment of this application.

As shown in (2) in FIG. 7A, the interface 303 further includes a zoom control 306 for adjusting a zoom ratio. For example, a zoom ratio shown on the interface 303 is 4.5×. In response to an operation performed by the user on "+" in the zoom control 306, the mobile phone increases the current zoom ratio, for example, to 5.0×. In response to an operation performed by the user on "—" in the zoom control 306, the mobile phone decreases the current zoom ratio, for example, to 4.0×.

In some embodiments, when the electronic device receives a zoom operation performed by the user, the electronic device starts a corresponding camera based on the zoom operation to capture raw image frames. For example, to display a preview image corresponding to the target zoom ratio, the electronic device needs to start the secondary camera, and capture raw image frames through cooperation between the primary camera and the secondary camera. Then the electronic device displays, based on the raw image frames, a preview image corresponding to the target zoom ratio. For example, when a range of the target zoom ratio is [1.0×, 4.4×], the electronic device starts the primary camera to capture raw image frames, and displays, based on the raw image frames captured by the primary camera, a preview image corresponding to the target zoom ratio. When a range of the target zoom ratio is [4.5×, 4.9×], the electronic device starts both the primary camera and the secondary camera to capture raw image frames, and displays, based on the raw image frames captured by the primary camera and the secondary camera, a preview image corresponding to the target zoom ratio. When the target zoom ratio is greater than 5.0×, the electronic device starts the secondary camera to capture raw image frames, and displays, based on the raw image frames captured by the secondary camera, a preview image corresponding to the target zoom ratio.

It should be noted that, when the target zoom ratio is greater than 5.0×, the primary camera of the electronic device may also capture raw image frames, but a preview image finally displayed by the electronic device is generated based on the raw image frames captured by the secondary camera.

For example, when the user starts any camera (for example, the primary camera) of the electronic device for photographing, the electronic device displays a preview image. Before the electronic device receives a zoom operation input by the user, the electronic device displays a preview image corresponding to the reference zoom ratio (for example, 1×) of the primary camera. After the electronic device receives a zoom operation input by the user, if the zoom operation instructs the electronic device to display a preview image with a target zoom ratio of 4.5×, the electronic device starts the secondary camera. Then both the primary camera and the secondary camera of the electronic device capture raw image frames, and a preview image with a target zoom ratio of 4.5× is displayed based on the raw image frames captured by the primary camera and the secondary camera.

Figure 7B:
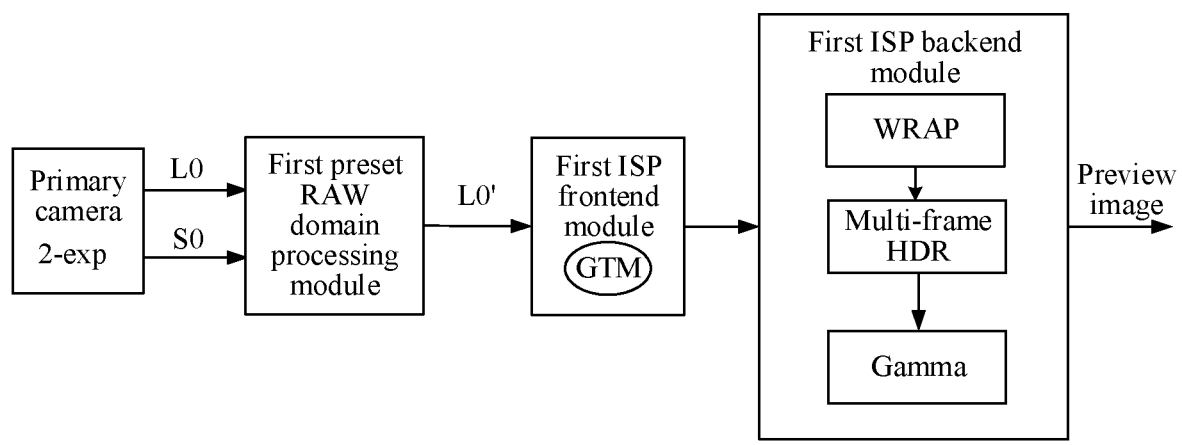
FIG. 7B is a second schematic flowchart of image processing according to an embodiment of this application.

In some embodiments, when the electronic device does not receive a zoom operation input by the user, or when the electronic device receives a zoom operation performed by the user, and a range of a target zoom ratio indicated by the zoom operation is [1.0×, 4.4×], the electronic device displays, by using raw image frames captured by the primary camera, a preview image corresponding to the target zoom ratio. For example, as shown in FIG. 7B, the primary camera captures raw image frames in the 2-exp overlapping exposure mode. For example, the primary camera captures a first image frame L0 within first exposure duration (for example, long-exposure duration), and captures a second image frame S0 within second exposure duration (for example, short-exposure duration). Then the primary camera inputs the first image frame L0 and the second image frame S0 to the first preset RAW domain processing module. The first preset RAW domain processing module synthesizes the first image frame L0 and the second image frame S0 by using an HDR algorithm, to generate a first long-exposure image frame L0'. The first preset RAW domain processing module transmits the first long-exposure image frame L0' to the first ISP frontend module. The first ISP frontend module processes the first long-exposure image frame L0' in "YUV domain", to convert the first long-exposure image frame L0' into a first long-exposure image frame L0' in a YUV format. Then the first ISP frontend module transmits the first long-exposure image frame L0' in the YUV format to the first ISP backend module. The first ISP backend module performs image enhancement on the first long-exposure image frame L0' in the YUV format. Finally, the first ISP backend module outputs the first long-exposure image frame L0' to the display, so that the display displays a preview image based on the first long-exposure image frame L0'.

A preset image algorithm may be set in the first ISP frontend module and the first ISP backend module to process the first long-exposure image frame L0'. For example, as shown in FIG. 7B, a graph transformation matching (Graph Transformation Matching, GTM) algorithm module is preset in the first ISP frontend module. The GTM module is configured to process the first long-exposure image frame L0' in "YUV domain". The GTM module is further configured to: in consecutive first long-exposure image frames L0', if local information in a first long-exposure image frame L0' at a specific moment is insufficient, the local information may be supplemented based on local information in an image at a previous moment and local information in an image at a next moment. An image simulation and transformation (WRAP) algorithm module, a multi-frame HDR algorithm module, a GAMMA (GAMMA) algorithm module, and the like may be preset in the first ISP backend module. The WRAP module is configured to perform image enhancement on the first long-exposure image frame L0'. The multi-frame HDR algorithm module is configured to correct a dynamic range of the first long-exposure image frame L0'. For example, after the first long-exposure image frame L0' is processed by the multi-frame HDR algorithm module, a continuous multi-frame HDR image is generated. The GAMMA algorithm module may perform electric image stabilization (electric image stabilization, EIS) on the first long-exposure image frame L0', and perform dynamic compression on the first long-exposure image frame L0'.

Figure 8A:
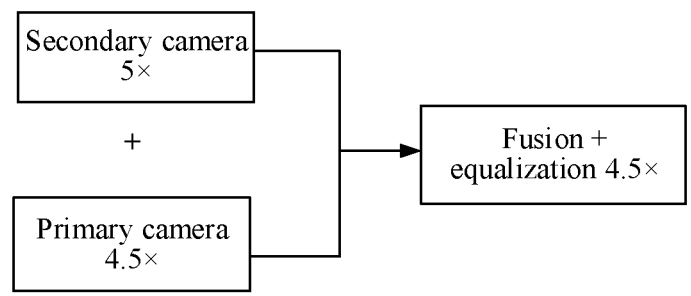
FIG. 8A is a schematic diagram of fusion of zoom ratios of a primary camera and a secondary camera according to an embodiment of this application.

In some other embodiments, the electronic device receives a zoom operation input by the user, and the zoom operation is used for instructing the electronic device to display a preview image with a target zoom ratio of 4.5×. On this basis, in response to the zoom operation, the electronic device starts the secondary camera to capture raw image frames. That is, both the primary camera and the secondary camera included in the electronic device capture raw image frames. For example, as shown in FIG. 8A, the primary camera of the electronic device captures raw image frames based on the target zoom ratio of 4.5×, that is, a zoom ratio of raw image frames output by the primary camera is 4.5×. In addition, the secondary camera of the electronic device captures raw image frames based on the reference zoom ratio of 5.0×, that is, a zoom ratio of raw image frames output by the secondary camera is 5.0×. On this basis, the electronic device performs algorithm processing such as fusion and equalization on the raw image frames with a zoom ratio of 4.5× that are captured by the primary camera and the raw image frames with a zoom ratio of 5.0× that are captured by the secondary camera, to generate a preview image with a zoom ratio of 4.5×.

Figure 8B:
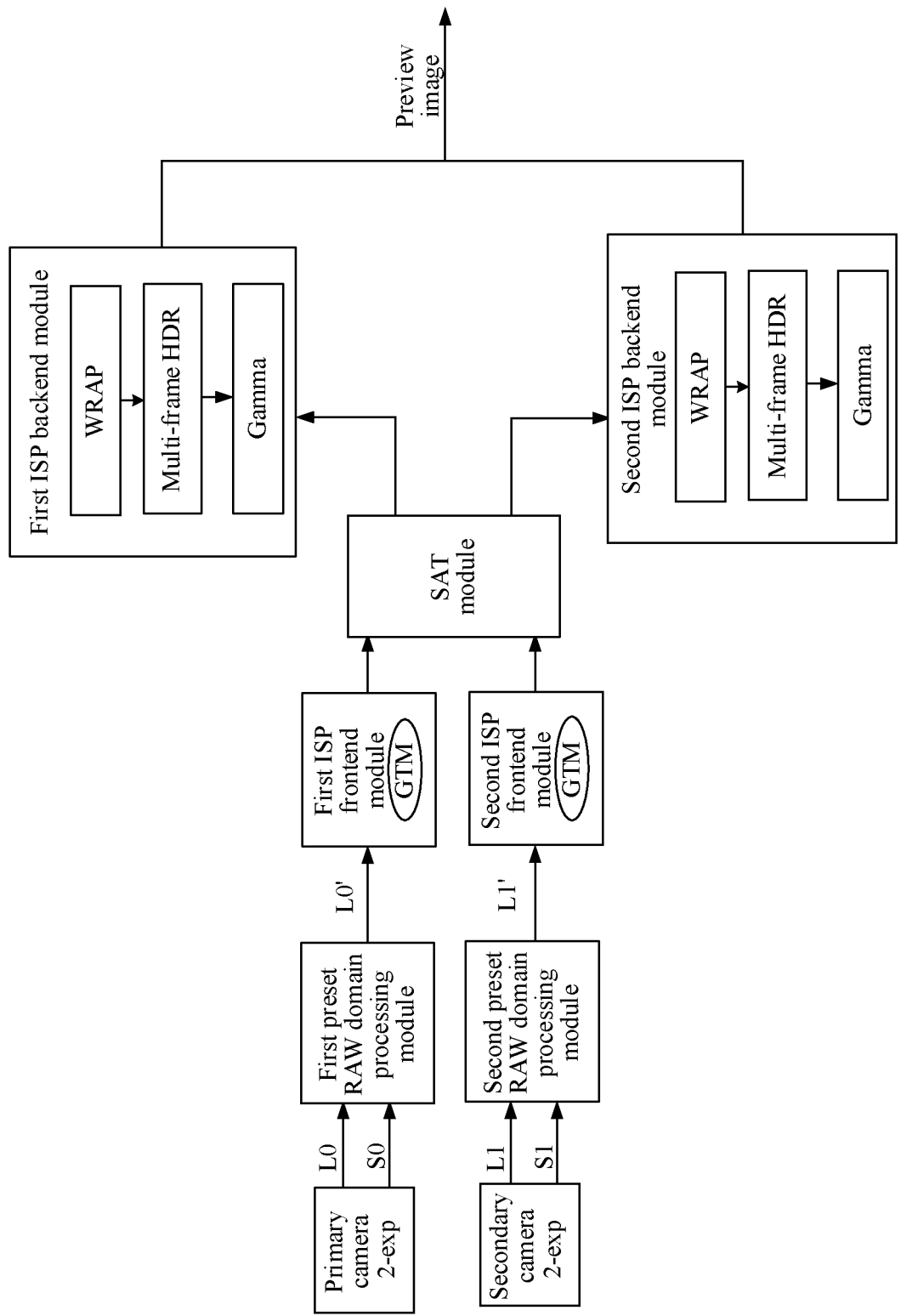
FIG. 8B is a third schematic flowchart of image processing according to an embodiment of this application.

For example, as shown in FIG. 8B, the primary camera captures raw image frames in the 2-exp overlapping exposure mode. For example, the primary camera captures a first image frame L0 within first exposure duration (for example, long-exposure duration), and captures a second image frame S0 within second exposure duration (for example, short-exposure duration). The primary camera inputs the first image frame L0 and the second image frame S0 to the first preset RAW domain processing module. The first preset RAW domain processing module is configured to synthesize the first image frame L0 and the second image frame S0 by using an HDR algorithm, to generate a first long-exposure image frame L0'. Then the first preset RAW domain processing module inputs the first long-exposure image frame L0' to the first ISP frontend module. The first ISP frontend module is configured to process the first long-exposure image frame L0' in "YUV domain", to convert the first long-exposure image frame L0' into a first long-exposure image frame L0' in a YUV format. Then the first ISP frontend module transmits the first long-exposure image frame L0' in the YUV format to the SAT module. In addition, the secondary camera captures raw image frames in the 2-exp overlapping exposure mode. For example, the secondary camera captures a third image frame L1 within first exposure duration (for example, long-exposure duration), and captures a fourth image frame S1 within second exposure duration (for example, short-exposure duration). The secondary camera inputs the third image frame L1 and the fourth image frame S1 to the second preset RAW domain processing module. The second preset RAW domain processing module is configured to synthesize the third image frame L1 and the fourth image frame S1 by using an HDR algorithm, to generate a second long-exposure image frame L1'. Then the second preset RAW domain processing module inputs the second long-exposure image frame L1' to the second ISP frontend module. The second ISP frontend module is configured to process the second long-exposure image frame L1' in "YUV domain", to convert the second long-exposure image frame L1' into a second long-exposure image frame L1' in a YUV format. Then the second ISP frontend module transmits the second long-exposure image frame L1' in the YUV format to the SAT module.

The SAT module is configured to perform fusion and equalization algorithm processing on the first long-exposure image frame L0' and the second long-exposure image frame L1', where a zoom ratio obtained through fusion of the first long-exposure image frame L0' and the second long-exposure image frame L1' is 4.5×. On this basis, the SAT module transmits the first long-exposure image frame L0' to the first ISP backend module. The first ISP backend module is configured to perform image enhancement on the first long-exposure image frame L0'. In addition, the SAT module transmits the second long-exposure image frame L1' to the second ISP backend module. The second ISP backend module is configured to perform image enhancement on the second long-exposure image frame L1'. Then the electronic device displays a preview image with a zoom ratio of 4.5× based on the first long-exposure image frame L0' and the second long-exposure image frame L1'. After the user taps a photographing control (for example, a photo control or a video control), the electronic device encodes the first long-exposure image frame L0' and the second long-exposure image frame L1', so that the display of the electronic device displays a photo file (or a video file) with a zoom ratio of 4.5×.

In addition, a preset image algorithm may be set in the first ISP frontend module and the first ISP backend module to process the first long-exposure image frame L0'. A preset image algorithm may be set in the second ISP frontend module and the second ISP backend module to process the second long-exposure image frame L1'. For example, still as shown in FIG. 8B, a GTM algorithm module is preset in the first ISP frontend module and the second ISP frontend module. The GTM algorithm module is configured to process the first long-exposure image frame L0' and the second long-exposure image frame L1' in "YUV domain". The GTM algorithm module is further configured to: in consecutive first long-exposure image frames L0', if local information in a first long-exposure image frame L0' at a specific moment is insufficient, the local information may be supplemented based on local information in an image at a previous moment and local information in an image at a next moment; and in consecutive second long-exposure image frames L1', if local information in a second long-exposure image frame L1' at a specific moment is insufficient, the local information may be supplemented based on local information in an image at a previous moment and local information in an image at a next moment. A WRAP algorithm module, a multi-frame HDR algorithm module, a GAMMA algorithm module, and the like may be preset in the first ISP backend module and the second ISP backend module. The WRAP module is configured to perform image enhancement on the first long-exposure image frame L0' and the second long-exposure image frame L1'. The multi-frame HDR algorithm module is configured to correct a dynamic range of the first long-exposure image frame L0' and the second long-exposure image frame L1'. For example, after the first long-exposure image frame L0' is processed by the multi-frame HDR algorithm module, a continuous multi-frame HDR image is generated; and after the second long-exposure image frame L1' is processed by the multi-frame HDR algorithm module, a continuous multi-frame HDR image is generated. The GAMMA algorithm module may perform EIS on the first long-exposure image frame L0' and the second long-exposure image frame L1', and perform dynamic compression on the first long-exposure image frame L0' and the second long-exposure image frame L1'.

It should be noted that, in this embodiment of this application, the GAMMA algorithm module preset in the first ISP backend module may perform EIS on the first long-exposure image frame L0' through an ordinary version of EIS. The GAMMA algorithm module preset in the second ISP backend module may perform EIS on the second long-exposure image frame L1' through an enhanced version of EIS.

Figure 9:
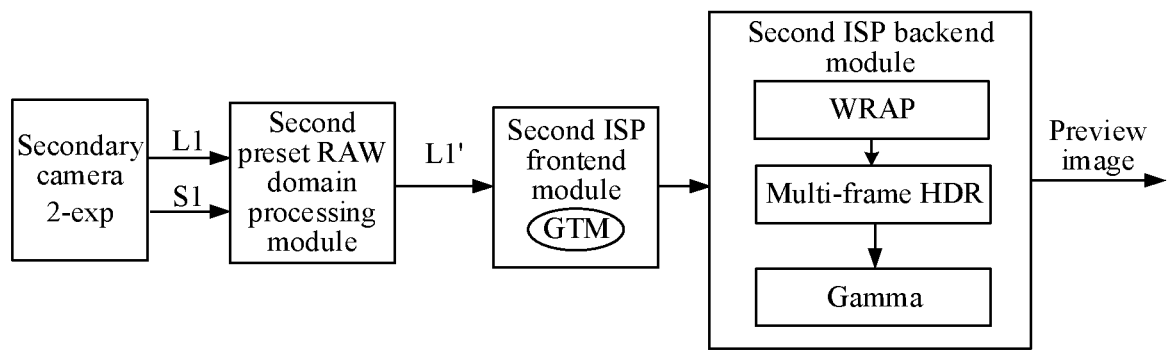
FIG. 9 is a fourth schematic flowchart of image processing according to an embodiment of this application.

In some other embodiments, the electronic device receives a zoom operation input by the user, and the zoom operation is used for instructing the electronic device to display a preview image with a target zoom ratio of 5.0×. On this basis, in response to the zoom operation, the electronic device starts the secondary camera to capture raw image frames. For example, as shown in FIG. 9, the secondary camera captures raw image frames in the 2-exp overlapping exposure mode. For example, the secondary camera captures a third image frame L1 within first exposure duration (for example, long-exposure duration), and captures a fourth image frame S1 within second exposure duration (for example, short-exposure duration). Then the secondary camera inputs the third image frame L1 and the fourth image frame S1 to the second preset RAW domain processing module. The second preset RAW domain processing module synthesizes the third image frame L1 and the fourth image frame S1 by using an HDR algorithm, to generate a second long-exposure image frame L1'. The second preset RAW domain processing module transmits the first long-exposure image frame L1' to the second ISP frontend module. The second ISP frontend module processes the second long-exposure image frame L1' in "YUV domain", to convert the second long-exposure image frame L1' into a second long-exposure image frame L1' in a YUV format. Then the second ISP frontend module transmits the second long-exposure image frame L1' in the YUV format to the second ISP backend module. The second ISP backend module performs image enhancement on the second long-exposure image frame L1' in the YUV format. Finally, the second ISP backend module outputs the second long-exposure image frame L1' to the display, so that the display displays a preview image with a zoom ratio of 5.0× based on the second long-exposure image frame L1'.

A preset image algorithm may be set in the second ISP frontend module and the second ISP backend module to process the second long-exposure image frame L1'. For example, as shown in FIG. 9, a GTM algorithm module is preset in the second ISP frontend module. The GTM module is configured to process the second long-exposure image frame L1' in "YUV domain". The GTM module is further configured to: in consecutive second long-exposure image frames L1', if local information in a second long-exposure image frame L1' at a specific moment is insufficient, the local information may be supplemented based on local information in an image at a previous moment and local information in an image at a next moment. A WRAP algorithm module, a multi-frame HDR algorithm module, a GAMMA algorithm module, and the like may be preset in the second ISP backend module. The WRAP module is configured to perform image enhancement on the second long-exposure image frame L1'. The multi-frame HDR algorithm module is configured to correct a dynamic range of the second long-exposure image frame L1'. For example, after the second long-exposure image frame L1' is processed by the multi-frame HDR algorithm module, a continuous multi-frame HDR image is generated. The GAMMA algorithm module may perform EIS on the second long-exposure image frame L1', and perform dynamic compression on the second long-exposure image frame L1'.

It should be understood that, in this embodiment of this application, the electronic device can implement two functions: photographing and video recording. To be specific, when the display of the electronic device displays a preview image, the preview image includes a photo preview image and a video preview image. In some embodiments, a difference between implementation of the photographing function and implementation of the video recording function by the electronic device lies in that the electronic device needs to be compatible with a zero shutter lag (zero shutter lag, ZSL) mechanism for implementing the photographing function. The ZSL means that, when the electronic device implements the photographing function, after the display of the electronic device displays a photo preview image, the electronic device retains some latest raw image frames in an image cache queue. When the electronic device receives a photographing operation performed by the user (that is, the photo control is triggered), the electronic device finds some related raw image frames from the image cache queue for encoding and display, to generate a photo file. That is, when the user triggers photographing, the electronic device may find related image frames from the image cache queue as soon as possible, and immediately present an image on the display of the electronic device, to implement zero shutter lag fast photographing.

In some embodiments, a zero shutter lag manager (zero shutter lag Manager, ZSL Manager) is further disposed in the electronic device. The ZSL manager is configured to: during photographing, manage raw image frames captured by the camera, and perform operations such as configuration, queuing, and frame selection on the raw image frames.

It should be noted that, during photographing by the electronic device, if the electronic device receives a zoom operation performed by the user, the electronic device needs to display a preview image corresponding to the target zoom ratio, and also needs to manage the image cache queue, so that the electronic device can quickly display a photo file when receiving a photographing operation performed by the user.

An example in which the electronic device is a mobile phone is used for description. During photographing by the mobile phone, the mobile phone displays an interface 401 shown in FIG. 10A. The interface 401 includes a zoom control 402 for the user to adjust a zoom ratio. For example, a current zoom ratio shown on the interface 401 is 1.0×. Then the mobile phone adjusts the current zoom ratio in response to an operation performed by the user on the zoom control 402. For example, the mobile phone increases the current zoom ratio in response to a sliding-up operation performed by the user on the zoom control 402.

Figure 10A:
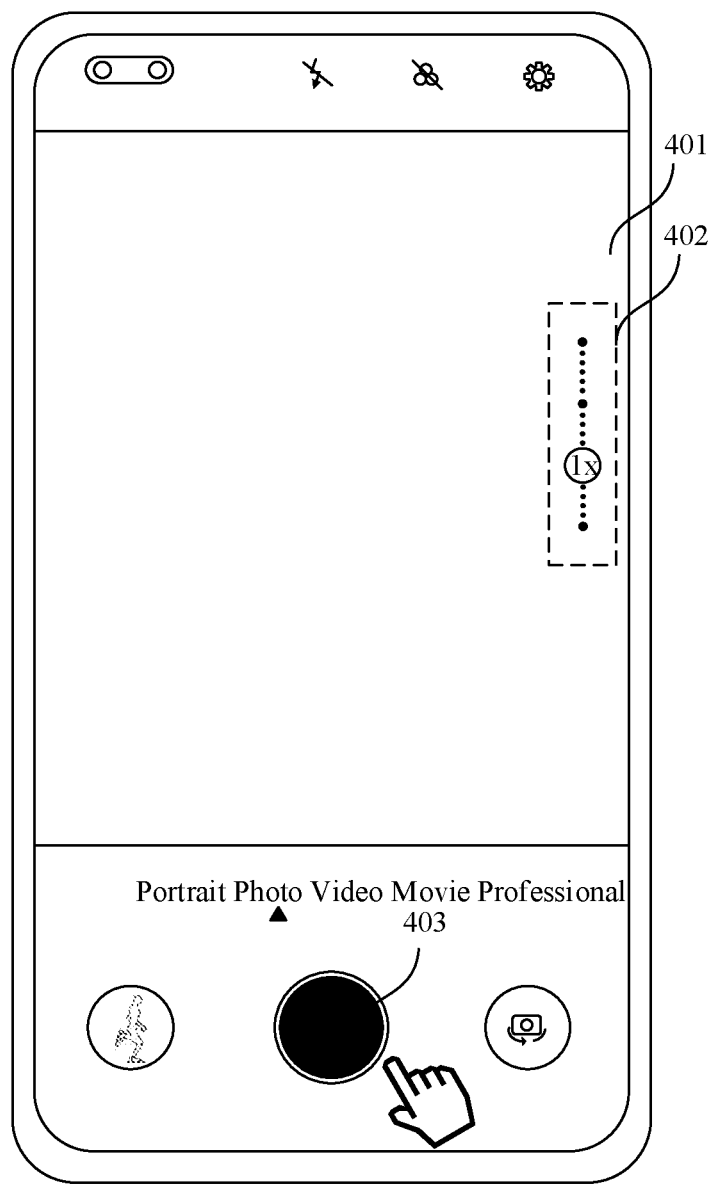
FIG. 10A is a schematic diagram of a photographing interface on a mobile phone according to an embodiment of this application.

Still as shown in FIG. 10A, the interface 401 further includes a photo control 403. The mobile phone may generate a photo file in response to an operation performed by the user on the photo control 403, and store the photo file in the mobile phone (for example, in an album application).

For example, the user is holding the electronic device for photographing. With reference to the foregoing embodiments, during photographing by the electronic device, the electronic device may start any camera (for example, the primary camera) to capture raw image frames. Before the electronic device receives a zoom operation input by the user, the electronic device displays a photo preview image corresponding to the reference zoom ratio (for example, 1×) of the primary camera. After the electronic device receives a zoom operation input by the user, if the zoom operation instructs the electronic device to display a photo preview image with a target zoom ratio greater than 4.5×, the electronic device starts the secondary camera. Then both the primary camera and the secondary camera of the electronic device capture raw image frames, and a photo preview image with a target zoom ratio greater than 4.5× is displayed based on the raw image frames captured by the primary camera and the secondary camera.

For example, when the electronic device does not receive a zoom operation input by the user, or when the electronic device receives a zoom operation performed by the user, and a range of a target zoom ratio indicated by the zoom operation is [1.0×, 4.4×], the electronic device displays, by using raw image frames captured by the primary camera, a photo preview image corresponding to the target zoom ratio. When a range of a target zoom ratio indicated by the zoom operation is [4.5×, 4.9×], the electronic device also starts the secondary camera to capture raw image frames, and displays, based on the raw image frames captured by the primary camera and the secondary camera, a photo preview image corresponding to the target zoom ratio. When a target zoom ratio indicated by the zoom operation is greater than 5.0×, the electronic device starts the secondary camera to capture raw image frames, and displays, based on the raw image frames captured by the secondary camera, a photo preview image corresponding to the target zoom ratio.

Figure 10B:
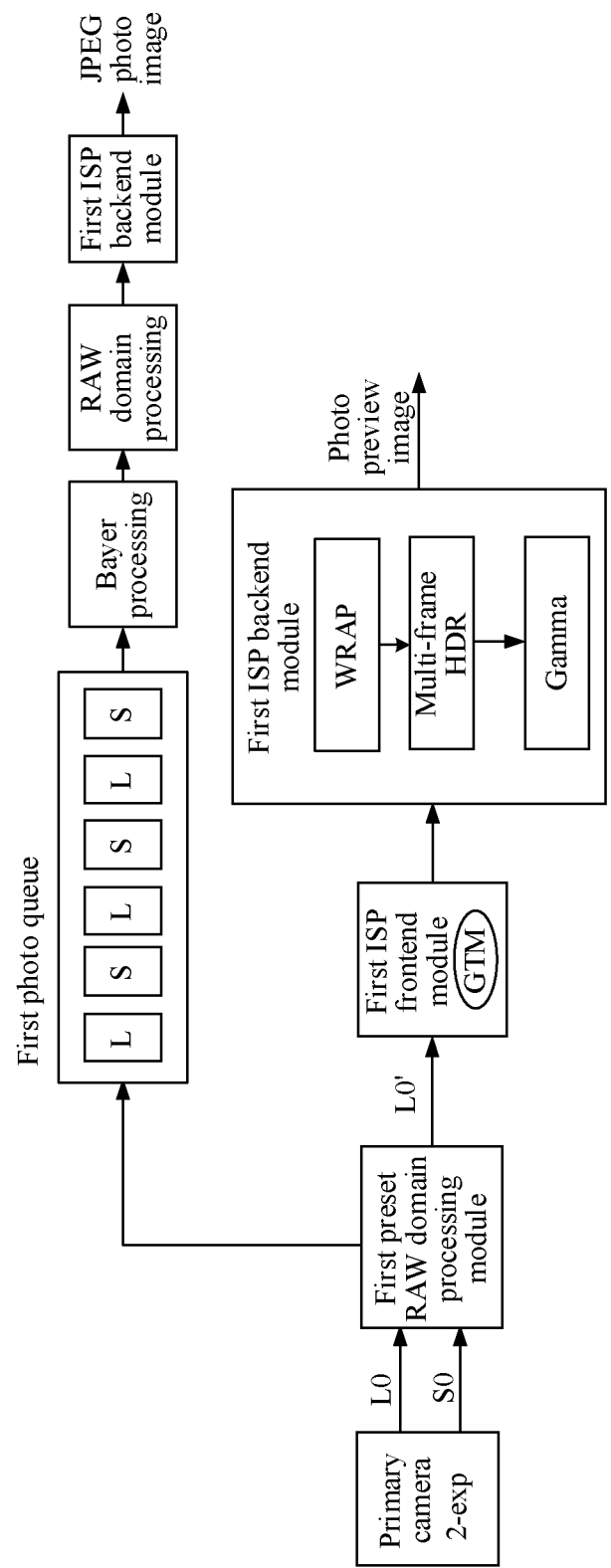
FIG. 10B is a fifth schematic flowchart of image processing according to an embodiment of this application.

In some embodiments, when the electronic device receives a zoom operation input by the user and the zoom operation is used for instructing the electronic device to display a photo preview image with a target zoom ratio of 4.4×, as shown in FIG. 10B, the primary camera captures raw image frames in the 2-exp overlapping exposure mode. For example, the primary camera captures a first image frame L0 within first exposure duration (for example, long-exposure duration), and captures a second image frame S0 within second exposure duration (for example, short-exposure duration). Then the primary camera inputs the first image frame L0 and the second image frame S0 to the first preset RAW domain processing module. In one aspect, the first preset RAW domain processing module synthesizes the first image frame L0 and the second image frame S0 by using an HDR algorithm, to generate a first long-exposure image frame L0'. The first preset RAW domain processing module transmits the first long-exposure image frame L0' to the first ISP frontend module. The first ISP frontend module processes the first long-exposure image frame L0' in "YUV domain", to convert the first long-exposure image frame L0' into a first long-exposure image frame L0' in a YUV format. Then the first ISP frontend module transmits the first long-exposure image frame L0' in the YUV format to the first ISP backend module. The first ISP backend module performs image enhancement on the first long-exposure image frame L0' in the YUV format. Finally, the first ISP backend module outputs the first long-exposure image frame L0' to the display, so that the display displays a photo preview image based on the first long-exposure image frame L0'. In another aspect, the first preset RAW domain processing module retains the first image frame L0 and the second image frame S0 in an image cache queue, to generate a first photo queue. For example, the first preset RAW domain processing module may transmit the first image frame L0 and the second image frame S0 to a first double data rate (double data rate, DDR) synchronous dynamic random access memory, to generate a photo queue. Then, when the electronic device receives a photographing operation performed by the user, the electronic device reads a first photo queue from the first DDR, and processes the first photo queue to generate a photo file in a target image format. The target image format may be, for example, joint photographic experts group (joint photographic experts group, JPEG) or another format. This is not limited in this embodiment of this application.

It should be noted that, for examples and descriptions of the first ISP frontend module and the first ISP backend module, reference may be made to the foregoing embodiments, and details are not described herein again.

For example, the electronic device includes a preset Bayer offline processing module and a preset RAW domain processing module. On this basis, the electronic device may perform Bayer processing and RAW domain processing on the photo queue. Then the electronic device transmits a processed first photo queue to the first ISP backend module. The first ISP backend module is configured to generate a photo file in a target image format (for example, a file in a JPEG format) based on the first photo queue.

For ease of understanding, the Bayer domain and the RAW domain are first described herein. Bayer domain: Each lens on a digital camera has a light sensor for measuring brightness of light. However, to obtain a full-color image, three light sensors usually need to respectively obtain information of three primary colors: red, green, and blue. To reduce costs and a size of a digital camera, a manufacturer usually uses a CCD or CMOS image sensor. Usually, a raw image output by the CMOS image sensor is in a Bayer domain RGB format, and a single pixel includes only one color value. To obtain a grayscale value of an image, color information of each pixel needs to be supplemented first, and then a grayscale value of each pixel is calculated. That is, the Bayer domain is a raw image format in a digital camera.

RAW domain: A RAW domain image, namely, a raw image, includes data processed by an image sensor of a digital camera, a scanner, or a movie film scanner. The RAW domain image is so named because the RAW domain image has not been processed, printed, or edited. The RAW domain image includes raw image information that has not undergone nonlinear processing in an ISP process.

It should be noted that, in this embodiment of this application, a raw image frame captured by the camera of the electronic device is a RAW domain image. On this basis, when the RAW domain image is converted into an image in another format, image information may be lost. Based on this, in the foregoing embodiment, when the electronic device receives the photographing operation performed by the user, the electronic device reads the first photo queue from the first DDR, processes the first photo queue in RAW domain by using the preset RAW domain processing module, and then transmits a processed raw image frame to the first ISP backend module for conversion into the photo file in the target image format. In this way, more details in the raw image frame can be retained, thereby improving display effect of the photo file.

Figure 11:
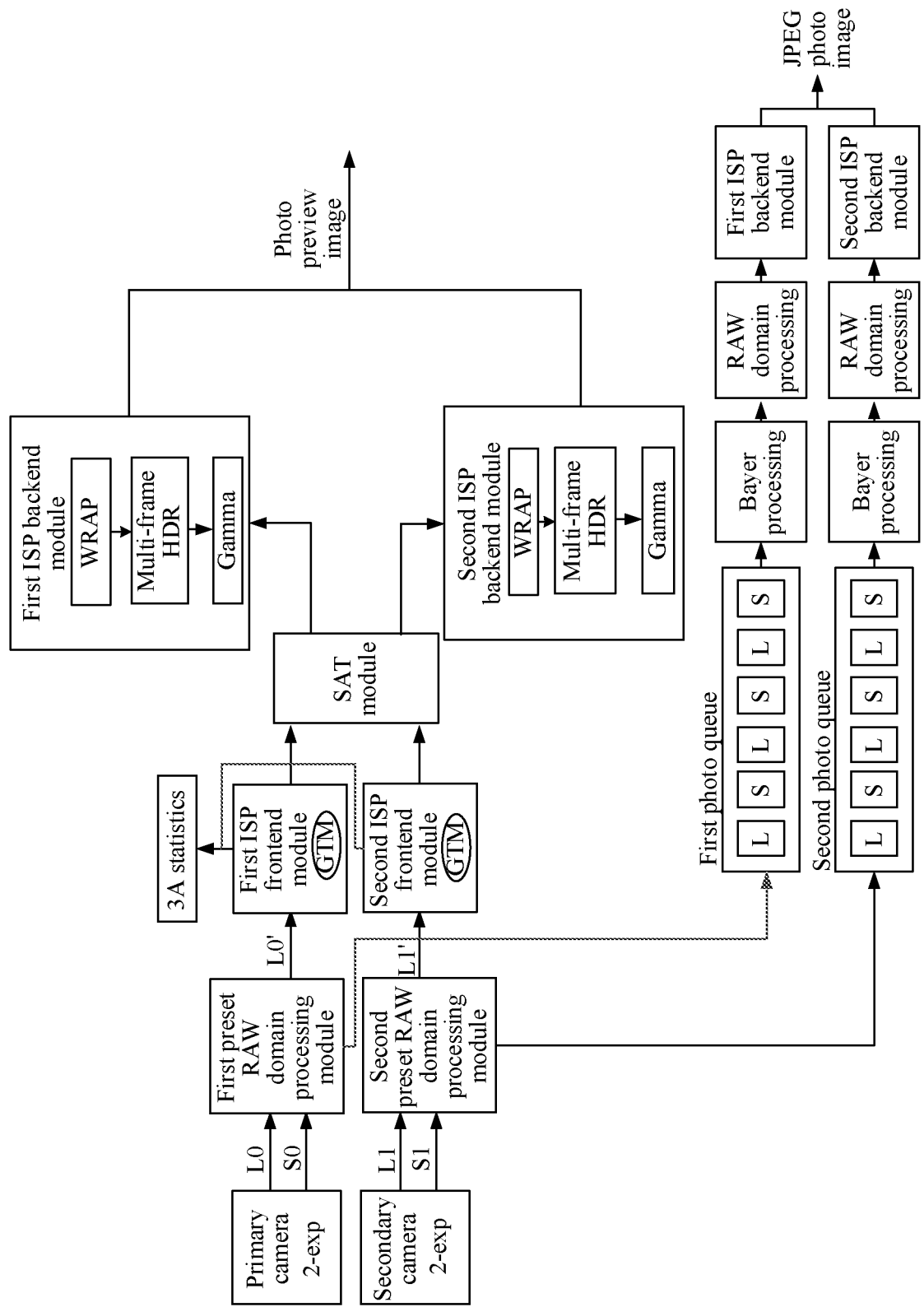
FIG. 11 is a sixth schematic flowchart of image processing according to an embodiment of this application.

In some other embodiments, when the electronic device receives a zoom operation input by the user and the zoom operation is used for instructing the electronic device to display a photo preview image with a target zoom ratio of 4.5×, as shown in FIG. 11, the primary camera captures raw image frames in the 2-exp overlapping exposure mode. For example, the primary camera captures a first image frame L0 within first exposure duration (for example, long-exposure duration), and captures a second image frame S0 within second exposure duration (for example, short-exposure duration). Then the primary camera inputs the first image frame L0 and the second image frame S0 to the first preset RAW domain processing module. In addition, the secondary camera captures raw image frames in the 2-exp overlapping exposure mode. For example, the secondary camera captures a third image frame L1 within first exposure duration (for example, long-exposure duration), and captures a fourth image frame S1 within second exposure duration (for example, short-exposure duration). Then the secondary camera inputs the third image frame L1 and the fourth image frame S1 to the second preset RAW domain processing module. In one aspect, the first preset RAW domain processing module synthesizes the first image frame L0 and the second image frame S0 by using an HDR algorithm, to generate a first long-exposure image frame L0'. The first preset RAW domain processing module transmits the first long-exposure image frame L0' to the first ISP frontend module. The first ISP frontend module processes the first long-exposure image frame L0' in "YUV domain", to convert the first long-exposure image frame L0' into a first long-exposure image frame L0' in a YUV format. Then the first ISP frontend module transmits the first long-exposure image frame L0' in the YUV format to the first ISP backend module. The first ISP backend module performs image enhancement on the first long-exposure image frame L0' in the YUV format. Correspondingly, the second preset RAW domain processing module synthesizes the third image frame L1 and the fourth image frame S1 by using an HDR algorithm, to generate a second long-exposure image frame L1'. The second preset RAW domain processing module transmits the second long-exposure image frame L1' to the second ISP frontend module. The second ISP frontend module processes the second long-exposure image frame L1' in "YUV domain", to convert the second long-exposure image frame L1' into a second long-exposure image frame L1' in a YUV format. Then the second ISP frontend module transmits the second long-exposure image frame L1' in the YUV format to the second ISP backend module. The second ISP backend module performs image enhancement on the second long-exposure image frame L1' in the YUV format. Finally, the first ISP backend module outputs the first long-exposure image frame L0' to the display, and the second ISP backend module outputs the second long-exposure image frame L1' to the display, so that the display displays a photo preview image based on the first long-exposure image frame L0' and the second long-exposure image frame L1'. In another aspect, the first preset RAW domain processing module retains the first image frame L0 and the second image frame S0 in an image cache queue, to generate a first photo queue; and the second preset RAW domain processing module retains the third image frame L1 and the fourth image frame S1 in an image cache queue, to generate a second photo queue. For example, the first preset RAW domain processing module may transmit the first image frame L0 and the second image frame S0 to a first DDR; and the second preset RAW domain processing module may transmit the third image frame L1 and the fourth image frame S1 to a second DDR. Then, when the electronic device receives a photographing operation performed by the user, the electronic device reads the first photo queue from the first DDR, and reads the second photo queue from the second DDR; and the electronic device separately performs Bayer processing and RAW domain processing on the first photo queue and the second photo queue. Then the electronic device transmits a processed first photo queue to the first ISP backend module, and transmits a processed second photo queue to the second ISP backend module.

It should be noted that, because a raw image frame captured by the primary camera and a raw image frame captured by the secondary camera have different fields of view (FOV), after the electronic device transmits the processed first photo queue to the first ISP backend module and the processed second photo queue to the second ISP backend module, the electronic device may further perform fusion on fields of view of the first photo queue and the second photo queue, and generate the photo file in the target image format based on a first photo queue and a second photo queue that are obtained through fusion.

It should be understood that the first photo queue includes image frames output by the primary camera, and the second photo queue includes image frames output by the secondary camera. When the electronic device generates the photo file in the target image format based on the first photo queue and the second photo queue, the electronic device may determine timestamps of the image frames in the first photo queue output by the primary camera and timestamps of the image frames in the second photo queue output by the secondary camera, and align the timestamps of the image frames in the first photo queue output by the primary camera with the timestamps of the image frames in the second photo queue output by the secondary camera.

For example, when the timestamps of the image frames in the first photo queue are the same as the timestamps of the image frames in the second photo queue, the electronic device may perform Bayer processing and RAW domain processing on image frames with a same timestamp. For another example, when the timestamps of the image frames in the first photo queue are different from the timestamps of the image frames in the second photo queue, the electronic device may treat two image frames whose timestamps are close as a group of images for undergoing Bayer processing and RAW domain processing. For example, if a difference between a first timestamp in the first photo queue and a second timestamp in the second photo queue is less than a preset value, the electronic device may treat an image frame corresponding to the first timestamp and an image frame corresponding to the second timestamp as a group of images for undergoing Bayer processing and RAW domain processing.

Still as shown in FIG. 11, in a process of generating, by the electronic device, a photo preview image by using a raw image frame captured by the primary camera and a raw image frame captured by the secondary camera, after the first preset RAW domain processing module transmits the first long-exposure image frame L0' obtained through fusion of the first image frame L0 and the second image frame S0 captured by the primary camera to the first ISP frontend module, and the second preset RAW domain processing module transmits the second long-exposure image frame L1' obtained through fusion of the third image frame L1 and the fourth image frame S1 captured by the secondary camera to the second ISP frontend module, the first long-exposure image frame L0' and the second long-exposure image frame L1' may be processed by a 3A statistical algorithm in the first ISP frontend module and a 3A statistical algorithm in the second ISP frontend module. For example, the 3A statistical algorithm includes an automatic focus (automatic focus, AF) algorithm, an automatic exposure (automatic exposure, AE) algorithm, and an automatic white balance (automatic white balance, AWB) algorithm.

Figure 12:
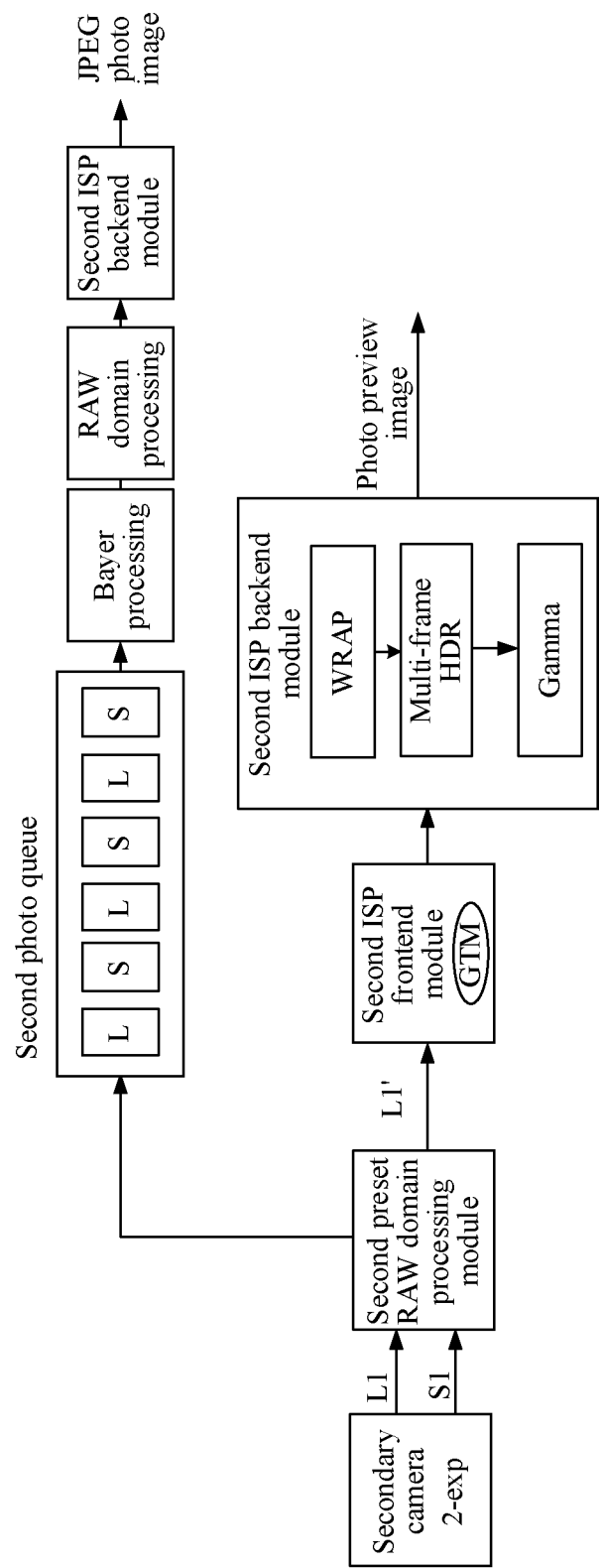
FIG. 12 is a seventh schematic flowchart of image processing according to an embodiment of this application.

In some other embodiments, when the electronic device receives a zoom operation input by the user and the zoom operation is used for instructing the electronic device to display a photo preview image with a target zoom ratio of 5.0×, as shown in FIG. 12, the secondary camera captures raw image frames in the 2-exp overlapping exposure mode. For example, the secondary camera captures a third image frame L1 within first exposure duration (for example, long-exposure duration), and captures a fourth image frame S1 within second exposure duration (for example, short-exposure duration). Then the secondary camera inputs the third image frame L1 and the fourth image frame S1 to the second preset RAW domain processing module. The second preset RAW domain processing module synthesizes the third image frame L1 and the fourth image frame S1 by using an HDR algorithm, to generate a second long-exposure image frame L1'. The second preset RAW domain processing module transmits the second long-exposure image frame L1' to the second ISP frontend module. The second ISP frontend module processes the second long-exposure image frame L1' in "YUV domain", to convert the second long-exposure image frame L1' into a second long-exposure image frame L1' in a YUV format. Then the second ISP frontend module transmits the second long-exposure image frame L1' in the YUV format to the second ISP backend module. The second ISP backend module performs image enhancement on the second long-exposure image frame L1' in the YUV format. The second ISP backend module outputs the second long-exposure image frame L1' to the display, so that the display displays a photo preview image based on the second long-exposure image frame L1'. In another aspect, the second preset RAW domain processing module retains the third image frame L1 and the fourth image frame S1 in an image cache queue, to generate a second photo queue; and the second preset RAW domain processing module may transmit the third image frame L1 and the fourth image frame S1 to a second DDR. Then, when the electronic device receives a photographing operation performed by the user, the electronic device reads the second photo queue from the second DDR; and the electronic device performs Bayer processing and RAW domain processing on the second photo queue. Then the electronic device transmits a processed second photo queue to the second ISP backend module. The Second ISP backend module is configured to generate a photo file in a target image format (for example, a file in a JPEG format) based on the second photo queue.

In the foregoing embodiment, when the electronic device is in a photographing state, the electronic device may retain raw image frames captured by the primary camera and/or the secondary camera in the image cache queue. When the photo control is triggered, the electronic device finds related raw image frames from the image cache queue for encoding and display, to generate a photo file. That is, when the user triggers photographing, the electronic device may find related image frames from the image cache queue as soon as possible, and immediately present an image on the display of the electronic device, to implement zero shutter lag fast photographing.

Figure 13:
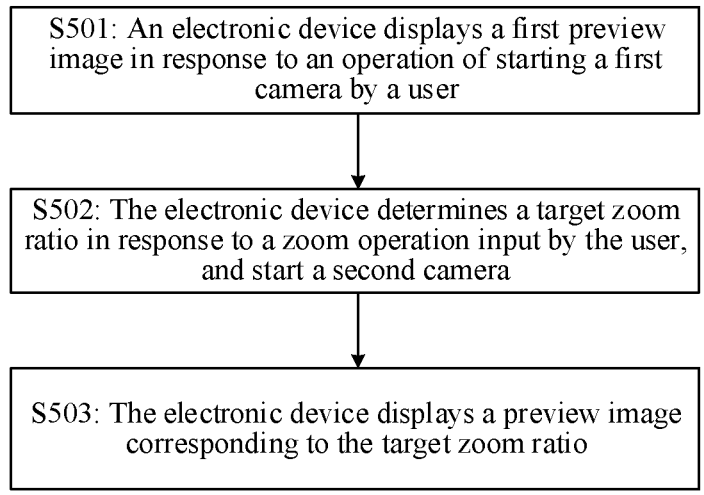
FIG. 13 is a schematic flowchart of an image processing method according to an embodiment of this application.

FIG. 13 is a schematic flowchart of an image processing method according to an embodiment of this application. As shown in FIG. 13, the method includes S501 to S503.

S501: An electronic device displays a first preview image in response to an operation of starting a first camera by a user.

The first preview image is generated based on a first long-exposure image frame. The first long-exposure image frame is generated by the electronic device by performing fusion on a first image frame and a second image frame. The first image frame and the second image frame are captured by the first camera, exposure duration of the first image frame is first exposure duration, and exposure duration of the second image frame is second exposure duration. The first exposure duration is different from the second exposure duration.

For example, the first camera may be the primary camera (or referred to as a primary camera) in the foregoing embodiments. The first preview image may be a video preview image or a photo preview image.

In some embodiments, as shown in FIG. 5B, FIG. 7B, FIG. 8B, FIG. 10B, and FIG. 11, for example, the first image frame may be L0, the second image frame may be S0, and the first long-exposure image frame may be L0'. In addition, with reference to the foregoing embodiments, the first exposure duration is longer than the second exposure duration. For example, the first exposure duration may be long-exposure duration, and the second exposure duration may be short-exposure duration.

S502: The electronic device determines a target zoom ratio in response to a zoom operation input by the user, and start a second camera.

For example, as shown in FIG. 7A and FIG. 10A, the zoom operation input by the user may be a touch operation (for example, a slide operation or a tap operation) performed by the user on the control 306 or the control 402. The zoom operation is used for determining the target zoom ratio.

The second camera may be, for example the secondary camera (or referred to as a secondary camera) in the foregoing embodiments.

S503: The electronic device displays a second preview image corresponding to the target zoom ratio.

When the target zoom ratio is greater than or equal to a first preset value and less than or equal to a second preset value, the second preview image is generated through fusion of a second long-exposure image frame and a third long-exposure image frame. The second long-exposure image frame is generated by the electronic device by performing fusion on a third image frame and a fourth image frame. The third long-exposure image frame is generated by the electronic device by performing fusion on a fifth image frame and a sixth image frame. The third image frame and the fourth image frame are captured by the first camera. The fifth image frame and the sixth image frame are captured by the second camera. Exposure duration of the third image frame and the fifth image frame is the first exposure duration, and exposure duration of the fourth image frame and the sixth image frame is the second exposure duration.

For example, as shown in FIG. 5B, FIG. 7B, FIG. 8B, FIG. 10B, and FIG. 11, the third image frame may be L0, the fourth image frame may be S0, and the second long-exposure image frame may be L0'. It should be noted that the first image frame, the second image frame, the third image frame, and the fourth image frame are captured by the first camera at different moments. For example, the first image frame and the second image frame are captured by the first camera at a first moment, and the third image frame and the fourth image frame are captured by the second camera at a second moment.

For example, as shown in FIG. 5B, FIG. 8B, FIG. 11, and FIG. 12, the fifth image frame may be L1, the sixth image frame may be S1, and the third long-exposure image frame may be L1'.

In some embodiments, with reference to the foregoing embodiments, for example, the first preset value may be 4.5×, and the second preset value may be 4.9×. To be specific, when a range of the target zoom ratio is [4.5×, 4.9×], the second preview image is generated through fusion of the second long-exposure image frame and the third long-exposure image frame, that is, the second preview image displayed by the electronic device is generated through fusion of raw image frames captured by the first camera and the second camera.

In some embodiments, when the target zoom ratio is greater than or equal to a third preset value and less than or equal to a fourth preset value, the second preview image is generated based on the second long-exposure image frame, and the fourth preset value is less than the first preset value.

For example, with reference to the foregoing embodiments, the third preset value may be 1.0×, and the fourth preset value may be 4.4×. To be specific, when a range of the target zoom ratio is [1.0×, 4.4×], the second preview image is generated based on the second long-exposure image frame, that is, the second preview image displayed by the electronic device is generated through fusion of raw image frames captured by the first camera.

It should be noted that, in this embodiment, when the target zoom ratio is greater than or equal to a third preset value and less than or equal to a fourth preset value, the second preview image is generated based on the second long-exposure image frame, and the second long-exposure image frame is generated through fusion of the third image frame and the fourth image frame that are captured by the first camera. In other words, in this embodiment, when the target zoom ratio is small, the second preview image is generated through fusion of raw image frames captured by the first camera. On this basis, the second preview image may alternatively be generated based on the first long-exposure image frame. For example, the third preset value may be 1×, and the fourth preset value may be 4.4×. When the target zoom ratio is 1×, the electronic device may generate the second preview image based on the first long-exposure image frame.

In some embodiments, when the target zoom ratio is greater than or equal to a fifth preset value, the second preview image is generated based on the third long-exposure image frame, where the fifth preset value is greater than the second preset value.

For example, with reference to the foregoing embodiments, the fifth preset value may be 5.0×. To be specific, when the target zoom ratio is greater than or equal to 5.0×, the second preview image is generated based on the third long-exposure image frame, that is, the second preview image displayed by the electronic device is generated through fusion of raw image frames captured by the second camera.

In some embodiments, when the target zoom ratio is greater than a first preset zoom ratio, the electronic device starts the second camera. For example, the first preset zoom ratio may be 4.4×. That is, the electronic device starts the second camera only when the target zoom ratio is greater than 4.4×. The second camera may be a telephoto camera (for example, the secondary camera in the foregoing embodiments).

In some embodiments, the second preview image is a video preview image, and the method further includes:

displaying, by the electronic device, a first interface, where the first interface is a preview interface during photographing, and the first interface includes a recording control; and generating, by the electronic device, a video file in response to an operation performed by the user on the recording control, where the video file is generated by the electronic device by performing fusion on the second long-exposure image frame and the third long-exposure image frame.

For example, as shown in (1) in FIG. 7A, the first interface may be the interface 301, and the recording control may be the control 302.

It should be noted that, in this embodiment, the video file generated by the electronic device is further related to the target zoom ratio. For example, when the target zoom ratio is greater than or equal to the third preset value and less than or equal to the fourth preset value, the video file is generated by the electronic device by performing fusion on the second long-exposure image frame. When the target zoom ratio is greater than or equal to the fifth preset value, the video file is generated by the electronic device by performing fusion on the third long-exposure image frame.

In some embodiments, the second preview image is a preview image on the electronic device during video recording.

For example, after the user taps the recording control 302, the second preview image is displayed on the interface 303 shown in (2) in FIG. 7A. It should be noted that an image displayed on the interface 303 during video recording may also be referred to as a preview image, and the electronic device generates a video file only after the user taps the recording end control 305.

In some embodiments, the second preview image is a photo preview image, and the method further includes: displaying, by the electronic device, a second interface, where the second interface is a preview interface during photographing, and the second interface includes a photo control; and generating, by the electronic device, a photo file in response to an operation performed by the user on the photo control, where the photo file is generated by the electronic device by performing fusion on the second long-exposure image frame and the third long-exposure image frame.

For example, as shown in FIG. 10A, the second interface may be the interface 401, and the photo control may be the control 403.

It should be noted that, in this embodiment, the photo file generated by the electronic device is further related to the target zoom ratio. For example, when the target zoom ratio is greater than or equal to the third preset value and less than or equal to the fourth preset value, the photo file is generated by the electronic device by performing fusion on the second long-exposure image frame. When the target zoom ratio is greater than or equal to the fifth preset value, the photo file is generated by the electronic device by performing fusion on the third long-exposure image frame.

In some embodiments, before the displaying a second preview image corresponding to the target zoom ratio, the method further includes: performing, by the electronic device, image conversion on the second long-exposure image frame and the third long-exposure image frame, where the image conversion includes: converting, by the electronic device, the second long-exposure image frame into a second long-exposure image frame in a target format, and converting the third long-exposure image frame into a third long-exposure image frame in a target format, where bandwidth for the second long-exposure image frame during transmission is higher than that for the second long-exposure image frame in the target format during transmission, and bandwidth for the third long-exposure image frame during transmission is higher than that for the third long-exposure image frame in the target format during transmission.

For example, with reference to the foregoing embodiments and as shown in FIG. 7B, FIG. 8B, FIG. 9, FIG. 10B, FIG. 11, and FIG. 12, the electronic device may perform image conversion on the second long-exposure image frame through the first ISP frontend module, and perform image conversion on the third long-exposure image frame through the second ISP frontend module. For example, a GTM algorithm module is preset in the first ISP frontend module and the second ISP frontend module. The GTM algorithm module is configured to perform image conversion on the second long-exposure image frame and the third long-exposure image frame. The image conversion may be, for example, processing in "YUV domain". On this basis, the second long-exposure image frame in the target format that is obtained through image conversion may be, for example, a second long-exposure image frame in a "YUV domain" format; and the third long-exposure image frame in the target format that is obtained through image conversion may be, for example, a third long-exposure image frame in a "YUV domain" format.

In some embodiments, the electronic device includes N consecutive second long-exposure image frames and M consecutive third long-exposure image frames, $N \geq 1$, $M \geq 1$, and the image conversion further includes: in the N consecutive second long-exposure image frames, if local information in a second long-exposure image frame at an $n^{th}$ moment does not meet a preset condition, repairing, by the electronic device, local information in second long-exposure image frames at an $(n-1)^{th}$ moment and an $(n+1)^{th}$ moment, where $n \geq 2$; and/or in the M consecutive third long-exposure image frames, if local information in a third long-exposure image frame at an $m^{th}$ moment does not meet a preset condition, repairing, by the electronic device, local information in third long-exposure image frames at an $(m-1)^{th}$ moment and an $(m+1)^{th}$ moment, where $m \geq 2$, where the local information includes at least one of a colors, a texture, or a shape.

With reference to the foregoing embodiments, it can be learned that the GTM algorithm module is further configured to: when local information in a second long-exposure image frame at a current moment is insufficient, supplement the local information based on local information in a second long-exposure image frame at a previous moment and local information in a second long-exposure image frame at a next moment; and correspondingly, when local information in a third long-exposure image frame at a current moment is insufficient, supplement the local information based on local information in a third long-exposure image frame at a previous moment and local information in a third long-exposure image frame at a next moment.

In some embodiments, the method further includes: processing, by the electronic device, the second long-exposure image frame in the target format and the third long-exposure image frame in the target format by using a multicamera smoothing algorithm, where the multicamera smoothing algorithm is used for reducing noise or distortion of the second long-exposure image frame in the target format and the third long-exposure image frame in the target format.

For example, with reference to the foregoing embodiments, the electronic device may process the second long-exposure image frame in the target format and the third long-exposure image frame in the target format by using a multicamera smoothing algorithm through a SAT algorithm module.

In some embodiments, the method further includes: processing, by the electronic device, the second long-exposure image frame in the target format and the third long-exposure image frame in the target format by using a first preset algorithm, where the processing by using the first preset algorithm includes at least one of image simulation and transformation processing, multi-frame high-dynamic-range image processing, or gamma processing.

For example, the electronic device processes the second long-exposure image frame in the target format by using a first preset algorithm through the first ISP backend module, and processes the third long-exposure image frame in the target format by using the first preset algorithm through the second ISP backend module.

In some embodiments, the method further includes: after the electronic device displays the second preview image, caching, by the electronic device, an image frame captured by the first camera to a first photo queue, and caching an image frame captured by the second camera to a second photo queue.

For example, the electronic device retains, through the first preset RAW domain processing module, the image frame captured by the first camera in a cache queue, to generate the first photo queue; and the electronic device retains, through the second preset RAW domain processing module, the image frame captured by the second camera in a cache queue, to generate the second photo queue. For example, the first preset RAW domain processing module and the second preset RAW domain processing module include a DDR. The first preset RAW domain processing module transmits the image frame captured by the first camera to the DDR, to generate the first photo queue; and the second preset RAW domain processing module transmits the image frame captured by the second camera to the DDR, to generate the second photo queue.

In some embodiments, the generating, by the electronic device, a photo file in response to an operation performed by the user on the photo control includes: selecting, by the electronic device, a first image from the first photo queue and selecting a second image from the second photo queue in response to an operation performed by the user on the photo control, where the first image is the latest frame of image among all images in the first photo queue, and the second image is the latest frame of image among all images in the second photo queue; and processing, by the electronic device, the first image and the second image by using a second preset algorithm, to generate a photo file in a target image format, where the processing by using the second preset algorithm is used for retaining details in the first image and the second image.

For example, the processing by using the second preset algorithm includes Bayer processing and RAW domain processing. For example, the target image format may be JPEG.

In some embodiments, the method further includes: processing, by the electronic device, the first image and the second image by using a third preset algorithm, where the third preset algorithm is used for performing fusion on a field of view of the first image and a field of view of the second image.

In some embodiments, the processing, by the electronic device, the first image and the second image by using a second preset algorithm includes: processing, by the electronic device, a first target image in the first photo queue and a second target image in the second photo queue by using the second preset algorithm, where a timestamp of the first target image is the same as a timestamp of the second target image, or a difference between a timestamp of the first target image and a timestamp of the second target image is less than a preset value.

An embodiment of this application provides an electronic device, and the electronic device may include a display, a first camera, a second camera, a memory, and one or more processors. The display is configured to display images captured by the first camera and the second camera or an image generated by the processor. The memory stores computer program code. The computer program code includes computer instructions. When the computer instructions are executed by the processor, the electronic device is enabled to perform the functions or the steps performed by the electronic device in the foregoing embodiments. For a structure of the electronic device, refer to the structure of the electronic device 100 shown in FIG. 3.

Figure 14:
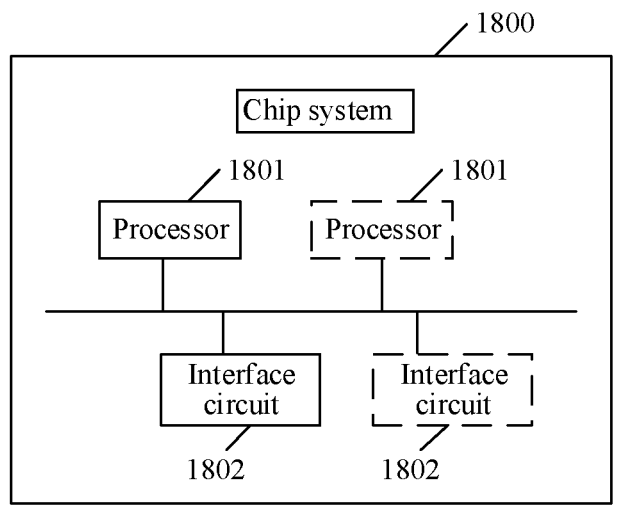
FIG. 14 is a schematic structural diagram of a chip system according to an embodiment of this application.

An embodiment of this application further provides a chip system. As shown in FIG. 14, the chip system 1800 includes at least one processor 1801 and at least one interface circuit 1802. The processor 1801 may be the processor 110 shown in FIG. 3 in the foregoing embodiments. The interface circuit 1802 may be, for example, an interface circuit between the processor 110 and an external memory 120, or an interface circuit between the processor 110 and an internal memory 121.

The processor 1801 and the interface circuit 1802 may be interconnected through a line. For example, the interface circuit 1802 may be configured to receive a signal from another apparatus (for example, a memory of an electronic device). For another example, the interface circuit 1802 may be configured to transmit a signal to another apparatus (for example, the processor 1801). For example, the interface circuit 1802 may read the instructions stored in the memory, and send the instructions to the processor 1801. When the instructions are executed by the processor 1801, the electronic device is enabled to perform the steps performed by the electronic device in the foregoing embodiments. Certainly, the chip system may further include other discrete devices. This is not specifically limited in this embodiment of this application.

An embodiment of this application further provides a computer-readable storage medium. The computer-readable storage medium includes computer instructions. When the computer instructions run on an electronic device, the electronic device is enabled to perform the functions or the steps performed by the electronic device in the foregoing method embodiments.

An embodiment of this application further provides a computer program product. When the computer program product runs on a computer, the computer is enabled to perform the functions or the steps performed by the electronic device in the foregoing method embodiments.

Based on the descriptions of the foregoing implementations, a person skilled in the art may clearly understand that, for a purpose of convenient and brief description, division into the foregoing functional modules is merely used as an example for illustration. In actual application, the foregoing functions may be allocated to different functional modules and implemented according to a requirement. In other words, an inner structure of the apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division during actual implementation. For example, a plurality of units or components may be combined or integrated into another apparatus, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated. A part shown as a unit may be one or more physical units, and may be located at one position, or may be distributed at different positions. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the related art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing content is merely specific embodiments of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method, applied to an electronic device, wherein the electronic device comprises a first camera and a second camera, and the method comprises:
    displaying, by the electronic device, a first preview image in response to an operation of starting the first camera by a user, wherein the first preview image is generated based on a first long-exposure image frame, and the first long-exposure frame is generated by the electronic device by performing fusion on a first image frame and a second image frame; and
    determining, by the electronic device, a target zoom ratio in response to a zoom operation input by the user, starting the second camera, and displaying a second preview image corresponding to the target zoom ratio, wherein when the target zoom ratio is greater than or equal to a first preset value and less than or equal to a second preset value, the second preview image is generated through fusion of a second long-exposure image frame and a third long-exposure image frame, the second long-exposure image frame is generated by the electronic device by performing fusion on a third image frame and a fourth image frame, and the third long-exposure image frame is generated by the electronic device by performing fusion on a fifth image frame and a sixth image frame, wherein
    exposure duration of the first image frame, the third image frame, and the fifth image frame is first exposure duration, exposure duration of the second image frame, the fourth image frame, and the sixth image frame is second exposure duration, and the first exposure duration is different from the second exposure duration; and
    the first image frame, the second image frame, the third image frame, and the fourth image frame are captured by the first camera, and the fifth image frame and the sixth image frame are captured by the second camera.

2. The method according to claim 1, wherein the method further comprises: when the target zoom ratio is greater than or equal to a third preset value and less than or equal to a fourth preset value, the second preview image is generated based on the second long-exposure image frame, wherein the fourth preset value is less than the first preset value.

3. The method according to claim 1, wherein the method further comprises:
    when the target zoom ratio is greater than or equal to a fifth preset value, the second preview image is generated based on the third long-exposure image frame, wherein
    the fifth preset value is greater than the second preset value.

4. The method according to claim 1, wherein the starting, by the electronic device, the second camera comprises:
    when the target zoom ratio is greater than a first preset zoom ratio, starting, by the electronic device, the second camera.

5. The method according to claim 1, wherein the second preview image is a video preview image, and the method further comprises:
    displaying, by the electronic device, a first interface, wherein the first interface is a preview interface during photographing, and the first interface comprises a recording control; and
    generating, by the electronic device, a video file in response to an operation performed by the user on the recording control, wherein the video file is generated by the electronic device by performing fusion on the second long-exposure image frame and the third long-exposure image frame.

6. The method according to claim 1, wherein the second preview image is a preview image on the electronic device during video recording.

7. The method according to claim 1, wherein the second preview image is a photo preview image, and the method further comprises:
    displaying, by the electronic device, a second interface, wherein the second interface is a preview interface during photographing, and the second interface comprises a photo control; and
    generating, by the electronic device, a photo file in response to an operation performed by the user on the photo control, wherein the photo file is generated by the electronic device by performing fusion on the second long-exposure image frame and the third long-exposure image frame.

8. The method according to claim 1, wherein before the displaying a second preview image corresponding to the target zoom ratio, the method further comprises:

performing, by the electronic device, image conversion on the second long-exposure image frame and the third long-exposure image frame, wherein the image conversion comprises:

converting, by the electronic device, the second long-exposure image frame into a second long-exposure image frame in a target format, and converting the third long-exposure image frame into a third long-exposure image frame in a target format, wherein bandwidth for the second long-exposure image frame during transmission is higher than that for the second long-exposure image frame in the target format during transmission, and bandwidth for the third long-exposure image frame during transmission is higher than that for the third long-exposure image frame in the target format during transmission.

9. The method according to claim 8, wherein the electronic device comprises N consecutive second long-exposure image frames and M consecutive third long-exposure image frames, N≥1, M≥1, and the image conversion further comprises:

in the N consecutive second long-exposure image frames, if local information in a second long-exposure image frame at an $n^{th}$ moment does not meet a preset condition, repairing, by the electronic device, local information in second long-exposure image frames at an $(n-1)^{th}$ moment and an $(n+1)^{th}$ moment, wherein n≥2; and/or in the M consecutive third long-exposure image frames, if local information in a third long-exposure image frame at an $m^{th}$ moment does not meet a preset condition, repairing, by the electronic device, local information in third long-exposure image frames at an $(m-1)^{th}$ moment and an $(m+1)^{th}$ moment, wherein m≥2, wherein the local information comprises at least one of a colors, a texture, or a shape.

10. The method according to claim 8, wherein the method further comprises:

processing, by the electronic device, the second long-exposure image frame in the target format and the third long-exposure image frame in the target format by using a multicamera smoothing algorithm, wherein the multicamera smoothing algorithm is used for reducing noise or distortion of the second long-exposure image frame in the target format and the third long-exposure image frame in the target format.

11. The method according to claim 10, wherein the method further comprises:

processing, by the electronic device, the second long-exposure image frame in the target format and the third long-exposure image frame in the target format by using a first preset algorithm, wherein the processing by using the first preset algorithm comprises at least one of image simulation and transformation processing, multi-frame high-dynamic-range image processing, or gamma processing.

12. The method according to claim 7, wherein the method further comprises:

after the electronic device displays the second preview image, caching, by the electronic device, an image frame captured by the first camera to a first photo queue, and caching an image frame captured by the second camera to a second photo queue.

13. The method according to claim 12, wherein the generating, by the electronic device, a photo file in response to an operation performed by the user on the photo control comprises:

selecting, by the electronic device, a first image from the first photo queue and selecting a second image from the second photo queue in response to an operation performed by the user on the photo control, wherein the first image is the latest frame of image among all images in the first photo queue, and the second image is the latest frame of image among all images in the second photo queue; and processing, by the electronic device, the first image and the second image by using a second preset algorithm, to generate a photo file in a target image format, wherein the processing by using the second preset algorithm is used for retaining details in the first image and the second image.

14. The method according to claim 13, wherein the method further comprises:

processing, by the electronic device, the first image and the second image by using a third preset algorithm, wherein the third preset algorithm is used for performing fusion on a field of view of the first image and a field of view of the second image.

15. The method according to claim 13, wherein the processing, by the electronic device, the first image and the second image by using a second preset algorithm comprises:

processing, by the electronic device, a first target image in the first photo queue and a second target image in the second photo queue by using the second preset algorithm, wherein a timestamp of the first target image is the same as a timestamp of the second target image, or a difference between a timestamp of the first target image and a timestamp of the second target image is less than a preset value.

16. An electronic device, comprising: a display, a first camera, a second camera, a memory, and one or more processors, wherein the display is configured to display images captured by the first camera and the second camera or an image generated by the processor, the memory stores computer program code, the computer program code comprises computer instructions, and when the computer instructions are executed by the processor, the electronic device is enabled to perform the method comprising:

displaying, by the electronic device, a first preview image in response to an operation of starting the first camera by a user, wherein the first preview image is generated based on a first long-exposure image frame, and the first long-exposure frame is generated by the electronic device by performing fusion on a first image frame and a second image frame; and determining, by the electronic device, a target zoom ratio in response to a zoom operation input by the user, starting the second camera, and displaying a second preview image corresponding to the target zoom ratio, wherein when the target zoom ratio is greater than or equal to a first preset value and less than or equal to a second preset value, the second preview image is generated through fusion of a second long-exposure image frame and a third long-exposure image frame, the second long-exposure image frame is generated by the electronic device by performing fusion on a third image frame and a fourth image frame, and the third long-exposure image frame is generated by the electronic device by performing fusion on a fifth image frame and a sixth image frame, wherein exposure duration of the first image frame, the third image frame, and the fifth image frame is first exposure duration, exposure duration of the second image frame, the fourth image frame, and the sixth image frame is second exposure duration, and the first exposure duration is different from the second exposure duration; and the first image frame, the second image frame, the third image frame, and the fourth image frame are captured by the first camera, and the fifth image frame and the sixth image frame are captured by the second camera.

17. A computer-readable storage medium, comprising computer instructions, wherein when the computer instructions run on an electronic device, the electronic device is enabled to perform the method comprising:

displaying, by the electronic device, a first preview image in response to an operation of starting the first camera by a user, wherein the first preview image is generated based on a first long-exposure image frame, and the first long-exposure frame is generated by the electronic device by performing fusion on a first image frame and a second image frame; and determining, by the electronic device, a target zoom ratio in response to a zoom operation input by the user, starting the second camera, and displaying a second preview image corresponding to the target zoom ratio, wherein when the target zoom ratio is greater than or equal to a first preset value and less than or equal to a second preset value, the second preview image is generated through fusion of a second long-exposure image frame and a third long-exposure image frame, the second long-exposure image frame is generated by the electronic device by performing fusion on a third image frame and a fourth image frame, and the third long-exposure image frame is generated by the electronic device by performing fusion on a fifth image frame and a sixth image frame, wherein exposure duration of the first image frame, the third image frame, and the fifth image frame is first exposure duration, exposure duration of the second image frame, the fourth image frame, and the sixth image frame is second exposure duration, and the first exposure duration is different from the second exposure duration; and the first image frame, the second image frame, the third image frame, and the fourth image frame are captured by the first camera, and the fifth image frame and the sixth image frame are captured by the second camera.

18. The electronic device according to claim 16, when the computer instructions are executed by the processor, the electronic device is enabled to perform the method further comprising:

when the target zoom ratio is greater than or equal to a third preset value and less than or equal to a fourth preset value, the second preview image is generated based on the second long-exposure image frame, wherein the fourth preset value is less than the first preset value.

19. The electronic device according to claim 16, when the computer instructions are executed by the processor, the electronic device is enabled to perform the method further comprising:

when the target zoom ratio is greater than or equal to a fifth preset value, the second preview image is generated based on the third long-exposure image frame, wherein the fifth preset value is greater than the second preset value.

20. The electronic device according to claim 16, wherein the starting, by the electronic device, the second camera comprises:

when the target zoom ratio is greater than a first preset zoom ratio, starting, by the electronic device, the second camera.

* * * * *